(12) United States Patent
Ohno et al.

(10) Patent No.: US 11,415,510 B2
(45) Date of Patent: Aug. 16, 2022

(54) OPTICAL INSPECTION APPARATUS

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP); Hideaki Okano, Yokohama Kanagawa (JP); Takahiro Kamikawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 50 days.

(21) Appl. No.: 17/006,933

(22) Filed: Aug. 31, 2020

(65) Prior Publication Data

US 2021/0131961 A1 May 6, 2021

(30) Foreign Application Priority Data

Nov. 6, 2019 (JP) .............................. JP2019-201697

(51) Int. Cl.
*G02B 27/30* (2006.01)
*G02B 27/28* (2006.01)
*G01N 21/47* (2006.01)

(52) U.S. Cl.
CPC ......... *G01N 21/474* (2013.01); *G02B 27/283* (2013.01); *G02B 27/30* (2013.01)

(58) Field of Classification Search
CPC ..... G01N 21/474; G02B 27/283; G02B 27/30
USPC ........................................... 356/237.2–237.6
See application file for complete search history.

(56) References Cited

U.S. PATENT DOCUMENTS

| 5,046,847 A * | 9/1991 | Nakata ................... G01N 21/94 356/338 |
| 5,963,328 A * | 10/1999 | Yoshida ............. G01N 21/8806 356/600 |
| 6,512,578 B1 * | 1/2003 | Komatsu ................ G01N 21/94 356/237.5 |

(Continued)

FOREIGN PATENT DOCUMENTS

| JP | 2006-58224 A | 3/2006 |
| JP | 2008-209726 A | 9/2008 |

(Continued)

OTHER PUBLICATIONS

Howes, "Rainbow schlieren and its applications," Applied Optics, 23:2449-60 (Jul. 15, 1984).

(Continued)

*Primary Examiner* — Isiaka O Akanbi
(74) *Attorney, Agent, or Firm* — Finnegan, Henderson, Farabow, Garrett & Dunner L.L.P.

(57) ABSTRACT

According to one embodiment, an optical inspection apparatus includes a first illuminator, an image-forming optical system, a scattering light selector, and an imaging element. The first illuminator is configured to emit a first light beam. The first light beam reflected by an object is incident on the image-forming optical system. The scattering light selector is configured to emit passing light beams of at least two mutually different wavelength regions, at the same time as the first light beam passes, a wavelength spectrum of at least one of the passing light beams being different from a wavelength spectrum of the reflected first light beam. The passing light beams simultaneously form an image on the imaging element.

9 Claims, 8 Drawing Sheets

(56) References Cited

U.S. PATENT DOCUMENTS

| | | | | |
|---|---|---|---|---|
| 2007/0103893 A1* | 5/2007 | Tanaka | ............... | G01N 21/956 |
| | | | | 362/138 |
| 2007/0263206 A1* | 11/2007 | LeBlanc | ............. | G01N 21/896 |
| | | | | 356/239.7 |
| 2007/0273886 A1* | 11/2007 | Matsumoto | ........... | G01N 21/57 |
| | | | | 356/446 |
| 2019/0219501 A1 | 7/2019 | Onho et al. | | |

FOREIGN PATENT DOCUMENTS

| | | |
|---|---|---|
| JP | 2016-38221 A | 3/2016 |
| JP | 2019-124542 A | 7/2019 |

OTHER PUBLICATIONS

Kim et al., "Multiaperture telecentric lens for 3D reconstruction," Optics Letters, 36:1050-52 (Apr. 1, 2011).

* cited by examiner

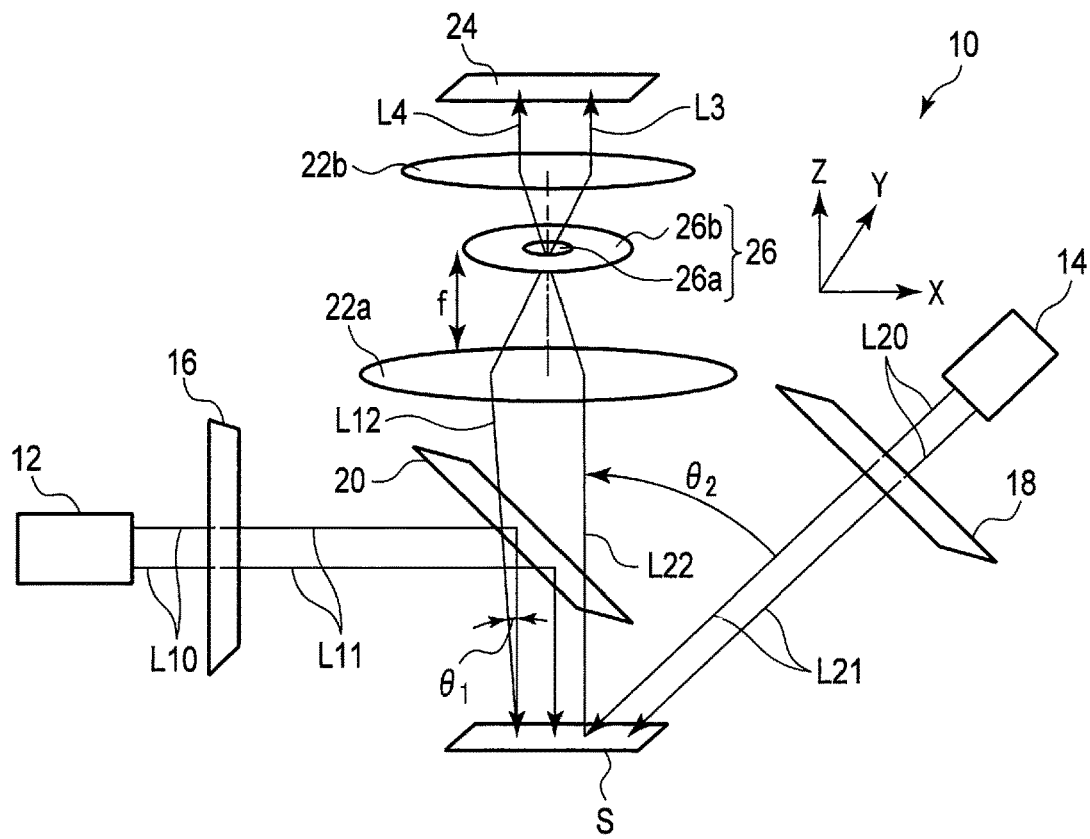
F I G. 3
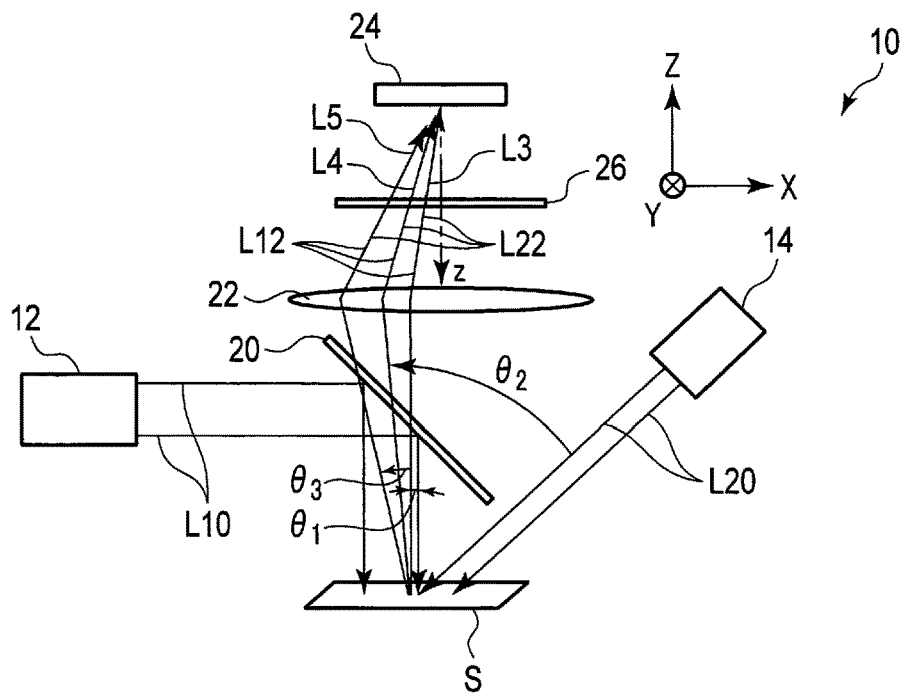
F I G. 4

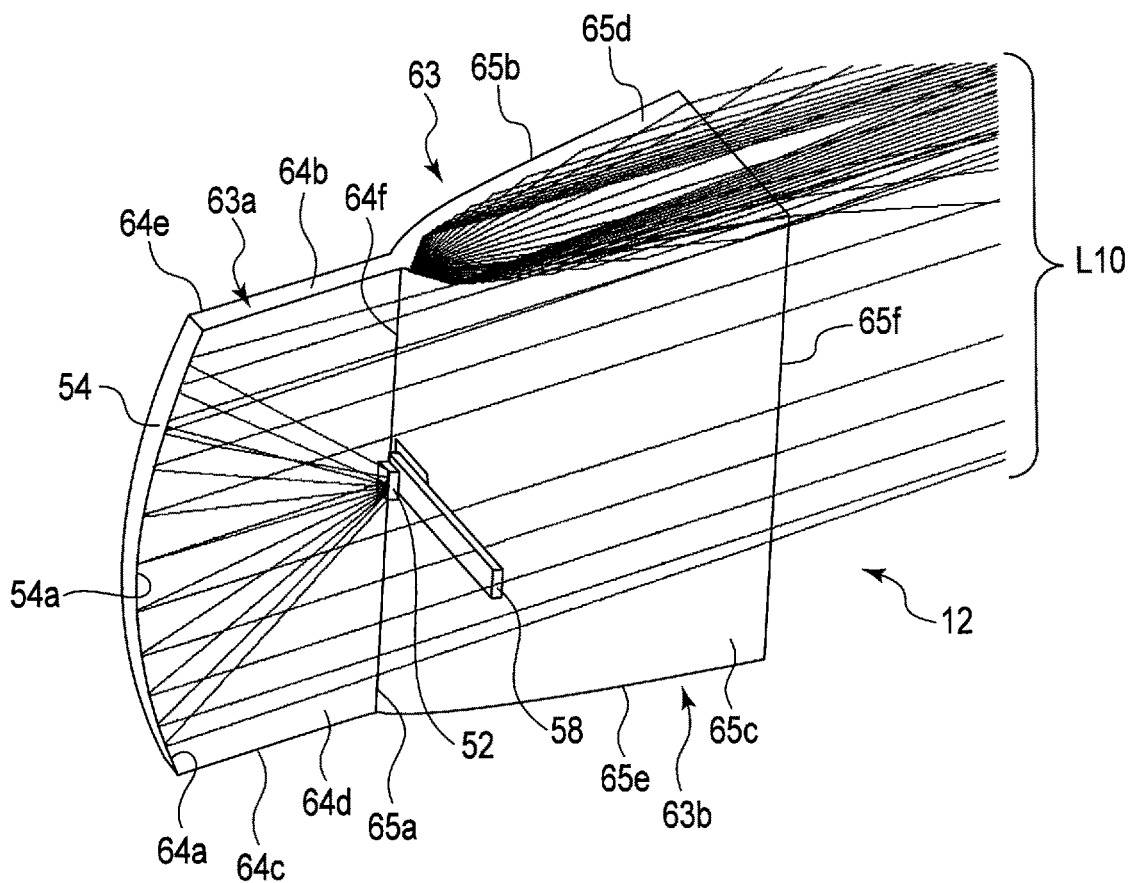
F I G. 11
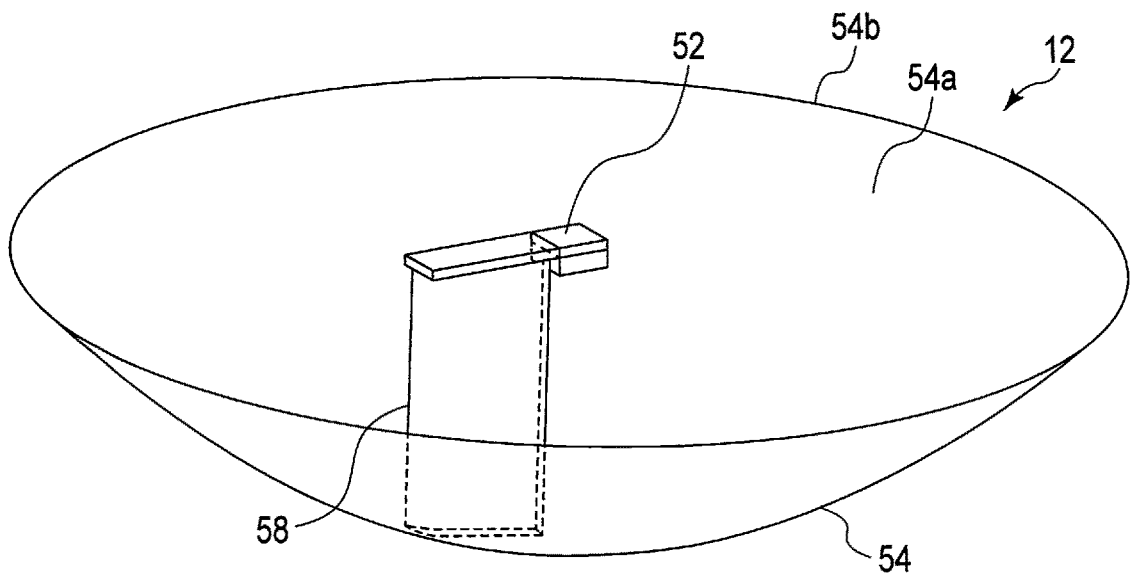
F I G. 12

OPTICAL INSPECTION APPARATUS

CROSS-REFERENCE TO RELATED APPLICATIONS

This application is based upon and claims the benefit of priority from Japanese Patent Application No. 2019-201697, filed Nov. 6, 2019, the entire contents of all of which are incorporated herein by reference.

FIELD

Embodiments described herein relate generally to an optical inspection apparatus.

BACKGROUND

In various fields of industry, a non-contact-type optical inspection technology has become important. In the optical inspection technology, as a method of quantitatively measuring a magnitude of scattering of light from an object, there is known a method of using a color aperture including an aperture portion to which a color filter is attached. In the optical inspection technology, there is also known an imaging method of acquiring scattering light by oblique incidence of light on an object.

BRIEF DESCRIPTION OF THE DRAWINGS

FIG. 3 is a schematic bird's eye view of an optical inspection apparatus according to a third embodiment.
FIG. 4 is a schematic bird's eye view of an optical inspection apparatus according to a fourth embodiment.
FIG. 11 is a schematic view illustrating an illuminator according to a modification of the sixth embodiment, and light beams emitted from the illuminator.
FIG. 12 is a schematic view of an illuminator according to a seventh embodiment.

DETAILED DESCRIPTION

According to one embodiment, an optical inspection apparatus includes a first illuminator, an image-forming optical system, a scattering light selector, and an imaging element. The first illuminator is configured to emit a first light beam. The first light beam reflected by an object is incident on the image-forming optical system. The scattering light selector is configured to emit passing light beams of at least two mutually different wavelength regions, at the same time as the first light beam passes, a wavelength spectrum of at least one of the passing light beams being different from a wavelength spectrum of the reflected first light beam. The passing light beams simultaneously form an image on the imaging element.

An object of the present embodiments is to provide an optical inspection apparatus that can simultaneously acquire scattering light beams with various angles.

Hereinafter, embodiments will be described with reference to the accompanying drawings. The drawings are schematic or conceptual ones, and the relationship between the thickness and width of each part, and the ratio in size between parts, etc. do not necessarily agree with the actual ones. Even when identical parts are depicted, the parts may be depicted with different dimensions and ratios between the drawings. In the present specification and drawings, the elements similar to those described in connection with preceding drawings are denoted by like reference signs, and a detailed description thereof is omitted unless where necessary.

First Embodiment

Figure 1:
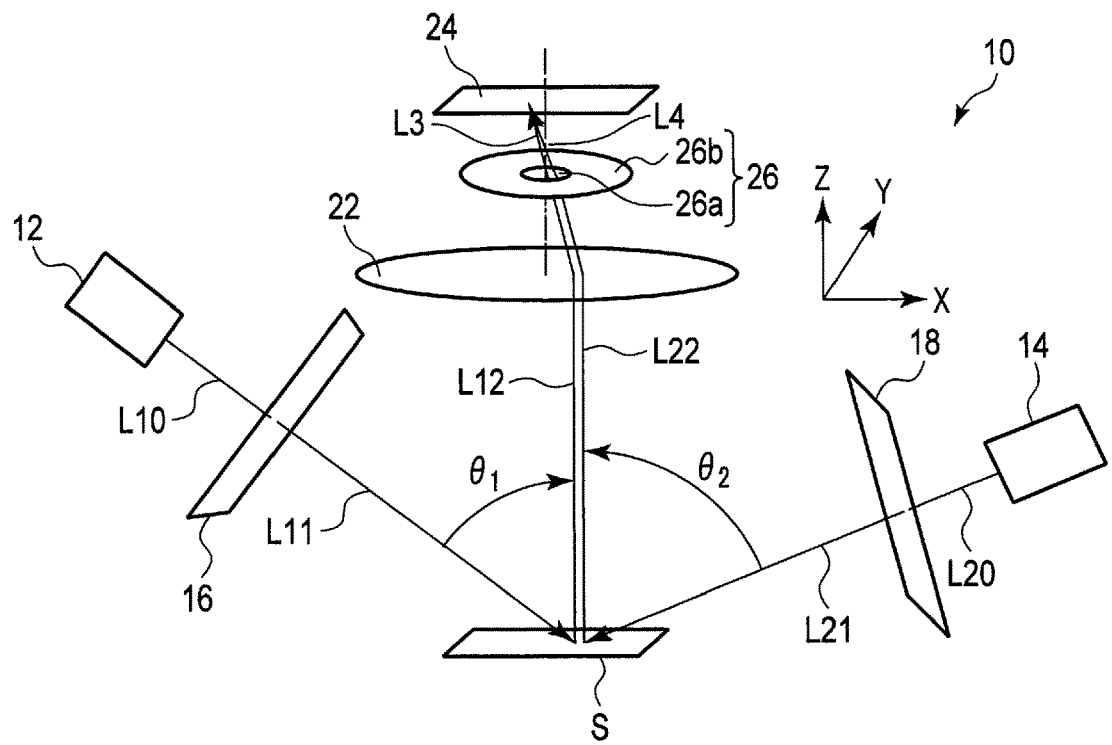
FIG. 1 is a schematic bird's eye view of an optical inspection apparatus according to a first embodiment.

FIG. 1 is a bird's eye view of an optical inspection apparatus (optical apparatus) 10 according to the present embodiment. FIG. 1 also illustrates light beams. As illustrated on FIG. 1, an XYZ coordinate system is set for the optical inspection apparatus 10. A Z-axis direction agrees with an optical axis of an imaging optical system of the optical inspection apparatus 10. An XY plane is parallel to an imaging surface (light-receiving surface) of an imaging element 24 (to be described later).

The optical inspection apparatus 10 according to the present embodiment includes a first illuminator (illumination device) 12 including a proper light source; a second illuminator (illumination device) 14 including a proper light source; a first band-pass filter (transmission filter) 16; and a second band-pass filter (transmission filter) 18. The optical inspection apparatus 10 further includes, as the imaging optical system, an image-forming optical system 22, an imaging element 24 and a scattering light selector (aperture) 26.

For example, LEDs are used as light sources of the first illuminator 12 and second illuminator 14. However, the light sources of the first illuminator 12 and second illuminator 14 are not limited to LEDs, but may be halogen lamps, xenon lamps, laser light sources, X-ray light sources, or infrared light sources, or any other kind of light sources which emit electromagnetic waves which are waves composed of an electric field component and a magnetic field component. The kinds of light sources may be different, for example, such that the light source of the first illuminator 12 is an LED and the light source of the second illuminator 14 is a halogen lamp. Here, it is assumed that the light emitted from the LEDs serving as the light sources of the first illuminator 12 and second illuminator 14 is light including components which are included in wavelength spectrum regions from 400 nm to 850 nm.

A first light lay (illumination light) L10 with a first wavelength (first wavelength region) is emitted from the first illuminator 12. It is assumed that the peak wavelength (first wavelength) of the spectrum of the first light beam L10 is, for example, 450 nm. This wavelength is a wavelength close to the wavelength of blue (B) of the international standard stipulated by the Commission internationale de l'éclairage (CIE). A second light lay (illumination light) L20 with a second wavelength (second wavelength region) is emitted from the second illuminator 14. It is assumed that the peak wavelength (second wavelength) of the spectrum of the second light beam L20 is, for example, 650 nm. This wavelength is a wavelength close to the wavelength of red (R) of the international standard stipulated by the CIE. The first wavelength region has, for example, a wavelength of 450 nm as the peak of the spectrum. A part of the spectrum of the first wavelength region overlaps the second wavelength region in some cases. The second wavelength region has, for example, a wavelength of 650 nm as the peak of the spectrum. A part of the spectrum of the second wavelength region overlaps the first wavelength region in some cases.

Light rays emitted from the first illuminator 12 and second illuminator 14 are positioned such that the light beams are made incident obliquely with respect to the optical axis (Z axis) of the imaging optical system. The surface of an object S may be a planar surface, a curved surface, or an irregular surface. The direction of the first light beam L10 emitted from the first illuminator 12 and the direction of the second light beam L20 emitted from the second illuminator 14 can be set as appropriate, if it is possible to illuminate a desired position of the object S that is an inspection object.

The first band-pass filter 16 is disposed on an optical path of the first light beam L10 emitted from the first illuminator 12. The first band-pass filter 16 passes the first wavelength (first wavelength region). If the light beam of the first wavelength region includes a component of the second wavelength region, the first band-pass filter 16 absorbs or reflects the component of the second wavelength region. Thus, the first band-pass filter 16 passes, for example, a component L11 of the first wavelength region, the component L11 not overlapping the component of the second wavelength region.

The second band-pass filter 18 is disposed on an optical path of the second light beam L20 emitted from the second illuminator 14. The second band-pass filter 18 passes the second wavelength (second wavelength region). If the light beam of the second wavelength region includes a component of the first wavelength region, the second band-pass filter 18 absorbs or reflects the component of the first wavelength region. Thus, the second band-pass filter 18 passes, for example, a component L21 of the second wavelength region, the component L21 not overlapping the component of the first wavelength region.

The image-forming optical system 22 is disposed to face the object S. In FIG. 1, the image-forming optical system 22 is schematically depicted as a single lens, but the image-forming optical system 22 may be a combination of lenses. In the present embodiment, for the purpose of simple description, it is assumed that the image-forming optical system 22 is a single lens.

The imaging element 24 images light which has passed through the image-forming optical system 22. Thus, the imaging element 24 is disposed on an optical axis of the image-forming optical system 22. For example, a CMOS area sensor is used as the imaging element 24. However, the imaging element 24 is not limited to the CMOS area sensor, but may be a CCD senor or a line sensor. A hyperspectral camera may be used as the imaging element 24. In short, the imaging element 24 may be any kind of element which senses light emanating from the first illuminator 12 and second illuminator 14. It is assumed that the imaging element 24 can separate, at each pixel, the first wavelength (light of the first wavelength region) and the second wavelength (light of the second wavelength region) into components, for example, the imaging element 24 can color-separate, at each pixel, the first wavelength (light of the first wavelength region) and the second wavelength (light of the second wavelength region) into RGB components.

The scattering light selector 26 is disposed on the optical axis of the image-forming optical system 22. The scattering light selector 26 is disposed between the image-forming optical system 22 and the imaging element 24. The scattering light selector 26 passes, in a central portion thereof, a first light beam L12 and a second light beam L22, and blocks these light beams by an outer peripheral portion thereof provided radially outward of the central portion. In the present embodiment, the scattering light selector 26 includes a ring-shaped aperture (wavelength selection region) 26a located in the central portion, and a blocking portion (or reflecting portion) 26b on the outside of the aperture 26a. Here, part of the light beam L12, L22 emanating from the image-forming optical system 22 is blocked by the blocking portion (or reflecting portion) 26b. It is assumed that the blocking is effected by absorption. However, the blocking of the part of the light beam L12, L22 emanating from the image-forming optical system 22 may be effected by reflection.

Next, an operation of the optical inspection apparatus 10 according to the present embodiment will be described.

The first illuminator 12 and second illuminator 14 simultaneously emit the light beams L10 and L20 toward the object (inspection object) S. If the first light beam L10 emitted from the first illuminator 12 includes a second wavelength component, the first band-pass filter 16 absorbs or reflects the second wavelength component. Then, the first wavelength L11 passes through the first band-pass filter 16. If the second light beam L20 emitted from the second illuminator 14 includes a first wavelength component, the second band-pass filter 18 absorbs or reflects the first wavelength component. Then, the second wavelength L21 passes through the second band-pass filter 18.

The first light beam L11 is directly incident on the surface of the object (inspection object) S. The second light beam L21 is directly incident on the surface of the object (inspection object) S. The first light beam L11 and second light beam L21 are reflected by the surface of the object S. Here, it is assumed that the term "reflection" is used to mean scattering and regular reflection, and this meaning is applied in the description below, unless otherwise indicated. The scattering first light beam L12 and scattering second light beam L22 are made incident on the scattering light selector 26 through the image-forming optical system 22, and emanate as a third light beam (passing light beam) L3 and a fourth light beam (passing light beam) L4 and form an image on the imaging element 24. At the time of scattering, the first light beam L11 is scattered as the first light beam L12 at a first scattering angle (first reflection angle) θ1. The first light beam L12 emanates as the third light beam L3 through the image-forming optical system 22 and scattering light selector 26. The second light beam L21 is scattered as the second light beam L22 at a second scattering angle (second reflection angle) θ2. The second light beam L22 emanates as the fourth light beam L4 through the image-forming optical system 22 and scattering light selector 26. Here, the first scattering angle θ1 is an angle formed between two light beams, namely the incident light beam (first light beam) L11 on the surface of the object S and the reflective light beam (first light beam) L12. It is assumed that the first scattering angle θ1 is 90° or less. The second scattering angle θ2 is an angle formed between two light beams, namely the incident light beam (second light beam) L21 on the surface of the object S and the reflective light beam (second light beam) L22. It is assumed that the second scattering angle θ2 is 90° or less. The third light beam L3 and fourth light beam L4 have different wavelengths. Thus, the third light beam L3 and fourth light beam L4 are imaged at each pixel of the imaging element 24 in a color-separated state.

Specifically, the third light beam L3 and fourth light beam L4 have mutually different wavelength regions. Of these light beams, the wavelength spectrum of the fourth light beam L4 is different from the wavelength spectrum of the light beam L12 which is the reflective light beam of the first light beam L11 reflected by the object. Here, the wavelength spectrum means a light intensity distribution relative to wavelength.

When the third light beam L3 is made incident on the imaging element 24, the first scattering angle θ1 is restricted by the scattering light selector 26. Specifically, although depending on the position and size of the aperture 26a of the scattering light selector 26, if the first scattering angle θ1 is large, part of the third light beam L3 is blocked by the blocking portion 26b of the scattering light selector 26. Similarly, as regards the fourth light beam L4, when the fourth light beam L4 is made incident on the imaging element 24, the second scattering angle θ2 is restricted by the scattering light selector 26. Specifically, although depending on the position and size of the aperture 26a of the scattering light selector 26, if the second scattering angle θ2 is large, part of the fourth light beam L4 is blocked by the blocking portion 26b of the scattering light selector 26. Here, the incidence direction of the second light beam L21 on the surface of the object S is set such that the second scattering angle θ2 between the second light beams L21 and L22 is greater than the first scattering angle θ1 between the first light beams L11 and L12. Then, in the imaging element 24, images corresponding to the first wavelength component and second wavelength component are associated with different scattering angles. Specifically, among light beams scattered at respective points on the surface of the object S, the light beams L3 and L4 having two mutually different scattering angles can be acquired. Thereby, the optical inspection apparatus 10 according to the present embodiment can simultaneously acquire light beam information on two different scattering angles, over the entire surface of the captured image acquired by the imaging element 24.

On the other hand, in the conventional art, in order to acquire such information, it is necessary to shift the timing of radiation of the first light beam and the timing of radiation of the second light beam, and to capture images at the times of radiation of the first light beam and second light beam. Specifically, the optical inspection apparatus 10 according to the present embodiment can acquire a greater number of pieces of information relating to the surface of the object S, than in the conventional art, in a shorter time period and by one-time imaging. In addition, in the conventional art, it is not always possible to distinguish the first scattering angle and the second scattering angle at a point on the surface of the object S. In particular, the large/small relationship between these scattering angles may change. On the other hand, in the present embodiment, the light beams L3 and L4 having two mutually different scattering angles can always be acquired by the scattering light selector 26.

It is assumed that the imaging element 24 can acquire RGB color images. According to the optical inspection apparatus 10 of the present embodiment, the imaging element 24 can acquire scattering light with two kinds of scattering angles θ1 and θ2 over the entire surface of the imaging surface of the imaging element 24. Thereby, at each pixel of the acquired image of the imaging element 24, the imaging element 24 can acquire, as an intensity ratio of RGB, a ratio between the third light beam (first scattering light) L3 of the first scattering angle θ1 and the fourth light beam (second scattering light) L4 of the second scattering angle θ2. Thus, the optical inspection apparatus 10 according the present embodiment can acquire scattering intensities with respect to the two scattering angles θ1 and θ2. Such an angle distribution of scattering intensity is called BRDF (Bidirectional Reflectance Distribution Function). Specifically, the optical inspection apparatus 10 according the present embodiment can acquire, by one shot, the BRDF with respect to the surface of the object S. It is known that the surface property or material of the object S can be discriminated by BRDF. Thus, the optical inspection apparatus 10 according to the present embodiment can acquire, by one shot, the BRDF with respect to the surface of the object S for the number of pixels of the imaging element 24. The optical inspection apparatus 10 can distinguish the surface property or material of the object S from the acquired BRDF.

In the conventional art, it is not always possible to distinguish the first scattering angle and the second scattering angle at a point on the surface of the object S. In particular, the large/small relationship between these scattering angles may change. In this case, since the BRDF is not exactly acquired, it is difficult to exactly distinguish the surface property of the object S.

On the other hand, in the optical inspection apparatus 10 according to the present embodiment, the scattering light selector 26 can simultaneously acquire the light beams L3 and L4 with two always different scattering angles, the scattering angles having a fixed large/small relationship. Thereby, the optical inspection apparatus 10 can acquire the exact BRDF, and can exactly distinguish the surface property of the object S.

As described above, according to the present embodiment, there is provided the optical inspection apparatus 10 which can simultaneously acquire scattering light beams with various angles with respect to the surface of the object S.

In the present embodiment, the example was described in which the first band-pass filter 16 is disposed on the optical axis of the light beam L10 emitted from the first illuminator 12 and the second band-pass filter 18 is disposed on the optical axis of the light beam L20 emitted from the second illuminator 14. If the first illuminator 12 emits not the first light beam L10 but the first light beam L11, the first band-pass filter 16 may be unnecessary. In addition, if the second illuminator 14 emits not the second light beam L20 but the second light beam L21, the second band-pass filter 18 may be unnecessary.

Note that, in the present embodiment, the first light beam L10 emitted from the first illuminator 12 and the second light beam L20 emitted from the second illuminator 14 are light beams of different wavelength regions. For example, as will be described in a fourth embodiment (to be describe later), if light beams including a plurality of wavelength regions, such as the first wavelength (first wavelength region) and third wavelength (third wavelength region), can be emitted from the first illuminator 12, the number of illuminators 12 may be one. In this case, if the light beam is separated into, for example, two light beams, in accordance with wavelength regions by using an optical element as appropriate, the light beams L11 and L21 can be made incident on the surface of the object S from a plurality of directions.

Second Embodiment

Figure 2:
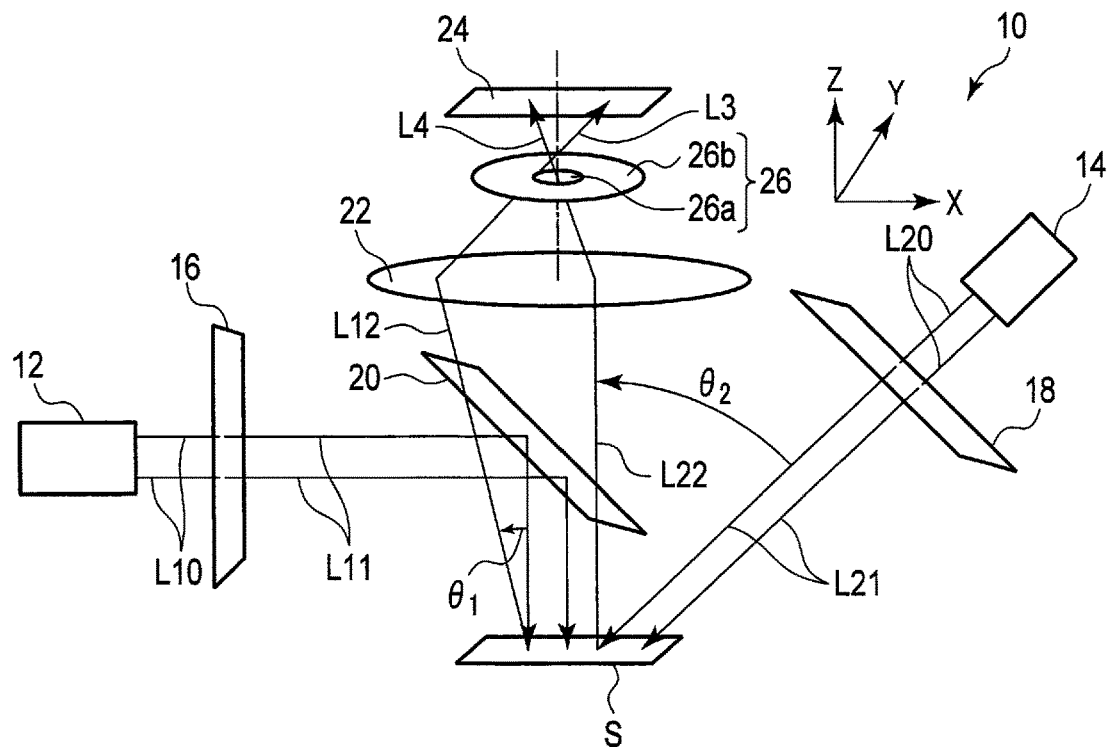
FIG. 2 is a schematic bird's eye view of an optical inspection apparatus according to a second embodiment.

FIG. 2 is a bird's eye view of an optical inspection apparatus 10 according to the present embodiment. FIG. 2 also illustrates light beams. The second embodiment is a modification of the first embodiment.

The optical inspection apparatus 10 according to the present embodiment includes the first illuminator 12, the second illuminator 14, the first band-pass filter 16, and the second band-pass filter 18. The optical inspection apparatus 10 further includes the image-forming optical system 22, the imaging element 24, and the scattering light selector 26. In addition, the optical inspection apparatus 10 includes a non-polarizing beam splitter 20.

The first illuminator 12 is not parallel to the optical axis (Z axis) of the image-forming optical system 22, and is disposed in such a position that the first illuminator 12 emits the light beam 10 in parallel to the X axis.

The non-polarizing beam splitter 20 is disposed on the optical path of the first light beam L11 emanating from the first band-pass filter 16. The non-polarizing beam splitter 20 is disposed between the object S and the image-forming optical system 22. The non-polarizing beam splitter 20 is disposed such that the first light beam L11 travels toward the object S along the Z axis.

In FIG. 2, the non-polarizing beam splitter 20 is depicted as having a plate shape, but may have, for example, a cube shape. A half mirror with a transmissive light amount and a reflective light amount, which are substantially equal, may be used as the non-polarizing beam splitter 20.

As described in the first embodiment, the second illuminator 14 is positioned such that the light beam 21 is obliquely incident with respect to the optical axis (Z axis).

Next, an operation of the optical inspection apparatus 10 according to the present embodiment will be described.

The first illuminator 12 and second illuminator 14 simultaneously emit the light beams L10 and L20. Similarly as described in the first embodiment, the first light beam L10 emitted from the first illuminator 12 passes through the first band-pass filter 16, and, by the first band-pass filter 16, the first wavelength L11 emanates from the first band-pass filter 16. The second light beam L20 emitted from the second illuminator 14 passes through the second band-pass filter 18, and, by the second band-pass filter 18, the second wavelength L21 emanates from the second band-pass filter 18.

The first light beam L11 is made incident, by the non-polarizing beam splitter 20, on the surface of the object (inspection object) S along the optical axis direction (Z-axis direction) of the image-forming optical system 22. The second light beam L21 is directly incident on the surface of the object S. The first light beam L11 and second light beam L21 are reflected by the surface of the object S. Here, it is assumed that the term "reflection" is used to mean scattering and regular reflection, and this meaning is applied in the description below, unless otherwise indicated. The scattering first light beam L12 of the first light beam L11 and the scattering second light beam L22 of the second light beam L21 pass through the non-polarizing beam splitter 20, and are made incident on the scattering light selector 26 through the image-forming optical system 22, and emanate as the third light beam L3 and fourth light beam L4 and form an image on the imaging element 24. Thus, the first light beams L11 and L12 are coaxial reflected illumination. At the time of scattering, the first light beam L11 is scattered as the first light beam L12 at a first scattering angle (first reflection angle) θ1. The first light beam L12 emanates as the third light beam L3 through the image-forming optical system 22 and scattering light selector 26. The second light beam L21 is scattered as the second light beam L22 at a second scattering angle (second reflection angle) θ2. The second light beam L22 emanates as the fourth light beam L4 through the image-forming optical system 22 and scattering light selector 26. Here, the first scattering angle θ1 is an angle formed between two light beams, namely the incident light beam L11 on the surface of the object S and the reflective light beam L12. The first scattering angle θ1 is 90° or less. The scattered reflected light beam L12 includes regular reflective light which is parallel to the incident light beam L11. The second scattering angle θ2 is an angle formed between two light beams, namely the incident light beam L21 on the surface of the object S and the reflective light beam L22. The second scattering angle θ2 is 90° or less. The third light beam L3 and fourth light beam L4 have different wavelengths. Thus, the third light beam L3 and fourth light beam L4 are imaged at each pixel of the imaging element 24 in a color-separated state.

Specifically, the scattering light selector 26 emits to the imaging element 24 the third light beam L3 and fourth light beam L4 which are passing light beams of at least two mutually different wavelength regions, at the same time as the first light beam L12 passes. The wavelength spectrum of the fourth light beam L4 is different from the wavelength spectrum of the first light beam L12 reflected by the object S.

When the third light beam L3 is made incident on the imaging element 24, the first scattering angle θ1 is restricted by the scattering light selector 26. Specifically, although depending on the position and size of the aperture 26a of the scattering light selector 26, if the first scattering angle 91 is large, part of the third light beam L3 is blocked by the blocking portion 26b of the scattering light selector 26. Similarly, as regards the fourth light beam L4, when the fourth light beam L4 is made incident on the imaging element 24, the second scattering angle θ2 is restricted by the scattering light selector 26. Specifically, although depending on the position and size of the aperture 26a of the scattering light selector 26, if the second scattering angle θ2 is large, part of the fourth light beam L4 is blocked by the blocking portion 26b of the scattering light selector 26. Here, the incidence direction of the second light beam L21 on the surface of the object S is set such that the second scattering angle 82 between the second light beams L21 and L22 is greater than the first scattering angle θ1 between the first light beams L11 and L12. Then, in the imaging element 24, images corresponding to the first wavelength component and second wavelength component are associated with different scattering angles. Specifically, among light beams scattered at respective points on the surface of the object S, the light beams L3 and L4 having two mutually different scattering angles can be acquired. Thereby, the optical inspection apparatus 10 according to the present embodiment can simultaneously acquire light beam information on two different scattering angles, over the entire surface of the captured image acquired by the imaging element 24.

On the other hand, in the conventional art, in order to acquire such information, it is necessary to shift the timing of radiation of the first light beam and the timing of radiation of the second light beam, and to capture images at the times of radiation of the first light beam and second light beam. Specifically, the optical inspection apparatus 10 according to the present embodiment can acquire a greater number of pieces of information relating to the object surface, than in the conventional art, in a shorter time period and by one-time imaging. The optical inspection apparatus 10 according the present embodiment can acquire, by one shot, the BRDF with respect to the surface of the object S for the number of pixels of the imaging element 24, and can distinguish the surface property or material of the object S from the acquired BRDF.

According to the present embodiment, there is provided the optical inspection apparatus 10 which can simultaneously acquire scattering light beams with various angles with respect to the surface of the object S.

Third Embodiment

FIG. 3 is a bird's eye view of an optical inspection apparatus 10 according to the present embodiment. FIG. 3 also illustrates light beams. The third embodiment is a modification of the first embodiment and/or the second embodiment.

The basic configuration of the optical inspection apparatus 10 according to the present embodiment is the same as in the second embodiment. Hereinafter, different parts from the second embodiment will be described.

In the present embodiment, the image-forming optical system 22 includes a first lens 22a and a second lens 22b. Although each of the first lens 22a and second lens 22b is schematically depicted as a single lens, each of the first lens 22a and second lens 22b may be a combination of lenses. The scattering light selector 26 is disposed on a focal plane of the first lens 22a of the image-forming optical system 22. Specifically, a first distance f between the first lens 22a and the scattering light selector 26 is equal to the focal distance of the first lens 22a. Hereinafter, a lens optical system, in which the scattering light selector 26 is disposed in a focal plane of at least one lens 22a of the lenses constituting the image-forming optical system 22, is referred to as an optical system (telecentric optical system) including a telecentric lens for the light passing an intersection point of the optical axis of the lens 22a with the scattering light selector 26.

Further, it is assumed that the first light beam L10 emitted from the first illuminator 12 is a collimated beam (parallel beam). It is also assumed that the second light beam L20 emitted from the second illuminator 14 is a parallel beam. As will be described later in a fifth embodiment and a sixth embodiment, the illuminator 12, 14, which emits the collimated beam, can be realized by a combination of a light source and a lens, or a combination of a light source and a reflector, or the like. Alternatively, when the light source is a laser and emits a collimated beam (parallel beam), an optical element such as a lens or a reflector is unnecessary.

The first light beam L11 is incident on the object S as coaxial reflected illumination, and is scattered by the surface of the object S as the light beam L12.

An operation of the optical inspection apparatus 10 according to the present embodiment will be described.

The first illuminator 12 and second illuminator 14 simultaneously emit the light beams L10 and L20. Similarly as described in the first embodiment and second embodiment, the first light beam L10 emitted from the first illuminator 12 passes through the first band-pass filter 16, and, by the first band-pass filter 16, the first wavelength L11 emanates from the first band-pass filter 16. The second light beam L20 emitted from the second illuminator 14 passes through the second band-pass filter 18, and, by the second band-pass filter 18, the second wavelength L21 emanates from the second band-pass filter 18.

The first light beam L11 is substantially a collimated beam (parallel beam), and is made incident, by the non-polarizing beam splitter 20, on the surface of the object (inspection object) S along the optical axis direction (Z-axis direction) of the image-forming optical system 22. The second light beam L21 is substantially a collimated beam (parallel beam), and is directly incident on the surface of the object S.

The first light beam L12 reflected from the object S passes through the center aperture 26a of the scattering light selector 26 by the first lens 22a of the image-forming optical system 22, and emanates as the third light beam L3. Here, the scattering light selector 26 is disposed on the focal plane of the first lens 22a of the image-forming optical system 22. Thus, of the light beams L12 reflected from the surface (inspection object) of the object S, the light beam L12, which is substantially parallel to the optical axis of the first lens 22a, passes through the scattering light selector 26, and emanates as the third light beam L3.

Similarly, the second light beam L21 passes through the aperture 26a of the center of the scattering light selector 26 by the first lens 22a of the image-forming optical system 22, and emanates as the fourth light beam L4. Here, the scattering light selector 26 is disposed on the focal plane of the first lens 22a of the image-forming optical system 22. Thus, of the light beams L22 reflected from the surface (inspection object) of the object S, the light beam L22, which is substantially parallel to the optical axis of the first lens 22a, passes through the scattering light selector 26, and emanates as the fourth light beam L4. The light beam L21 and the light beam L22 behave in the telecentric optical system.

The third light beam L3 and fourth light beam L4 pass through the second lens 22b, and form an image on the imaging element 24. Specifically, the first lens 22a and second lens 22b constitute the image-forming optical system 22.

The incidence angle of the first light beam L11 on the object S is substantially parallel to the optical axis of the image-forming optical system 22, and the reflection angle of the first light beam L12 from the object S is also substantially parallel to the optical axis. Thus, the first scattering angle θ1 is substantially zero, regardless of the incidence position. Thereby, the first scattering angle θ1 with respect to the surface of the object S is constant for all pixels of the imaging element 24.

Since the second light beam L21 is a collimated beam (parallel beam), the incidence angle of the second light beam L21 on the object S is constant regardless of the incidence position. In addition, the reflection angle of the second light beam L22 is substantially parallel to the optical axis. Thus, the second scattering angle θ2 with respect to the surface of the object S is constant regardless of the incidence position. Thereby, the second scattering angle θ2 with respect to the surface of the object S is constant for all pixels of the imaging element 24.

From the above, the optical inspection apparatus 10 of the present embodiment can make constant, over all pixels of the imaging element 24, the first scattering angle θ1 and the second scattering angle θ2 with respect to the surface of the object S. Thereby, the optical inspection apparatus 10 can detect and compare, in the imaging element 24, the intensities of light beams with respect to the same scattering angle over all pixels. The optical inspection apparatus 10 has an advantage that various tests can be conducted by utilizing the intensities of light beams at all pixels of the imaging element 24. For example, in the case where the surface property of the object S is uniform, when the intensity of the pixel value of the imaging element 24 does not change depending on the position with respect to the first light beam L12 or second light beam L22, it is understood that the surface of the object S is a planar surface. On the other hand, when the pixel value of the imaging element 24 changes depending on the position, it is understood that foreign matter exists or the surface of the object S is a curved surface or an irregular surface.

In a photometric stereo method using a plurality of light sources 12 and 14, the intensities with respect to the same scattering angle can be compared over all pixels of the imaging element 24. Thereby, there is an advantageous effect that the three-dimensional shape of the surface of the object S can easily be calculated by the optical inspection apparatus 10.

The optical inspection apparatus 10 according to the present embodiment can acquire, by one shot, the BRDF with respect to the surface of the object S for the number of pixels of the imaging element 24, and can distinguish the surface property or material of the object S from the acquired BRDF.

According to the present embodiment, there is provided the optical inspection apparatus 10 which can simultaneously acquire scattering light beams with various angles with respect to the surface of the object S.

Fourth Embodiment

FIG. 4 is a side view of an optical inspection apparatus 10 according to the present embodiment. FIG. 4 also illustrates light beams. The fourth embodiment is a modification of the first embodiment, the second embodiment and/or the second embodiment.

The basic configuration of the optical inspection apparatus 10 according to the present embodiment is the same as in the second embodiment. Hereinafter, different parts from the second embodiment will be described.

In the present embodiment, although the image-forming optical system 22 is schematically depicted as a single lens, the image-forming optical system 22 may be a combination of lenses. The scattering light selector 26 is disposed on a focal plane of the image-forming optical system 22. Specifically, a first distance f between the image-forming optical system 22 and the scattering light selector 26 is equal to the focal distance. In other words, the image-forming optical system 22 and the scattering light selector 26 of the present embodiment form a telecentric optical system.

Further, it is assumed that the first light beam L10 emitted from the first illuminator 12 is a collimated beam. It is also assumed that the second light beam L20 emitted from the second illuminator 14 is a collimated beam (parallel beam). The illuminator 12, 14, which emits the collimated beam L10, L20, can be realized by a combination of a light source and a lens, or a combination of a light source and a reflector, or the like. Alternatively, when the light source is a laser and emits a collimated beam, an optical element such as a lens or a reflector is unnecessary.

The first light beam L10 is incident on the surface of the object S as coaxial reflected illumination, and is scattered as the light beam L12.

In the present embodiment, it is assumed that the first light beam L10 includes a first wavelength and a third wavelength. It is assumed that the first wavelength is 450 nm and the third wavelength is 650 nm. The first wavelength is a wavelength close to the wavelength of blue (B) of the international standard stipulated by the CIE. The third wavelength is a wavelength close to the wavelength of red (R) of the international standard stipulated by the CIE. It is assumed that the second light beam L20 includes a second wavelength. It is assumed that the second wavelength is 550 nm. The second wavelength is a wavelength close to the wavelength of green (G) of the international standard stipulated by the CIE. Here, it is assumed that the first light beam L10 does not include the second wavelength.

Figure 5:
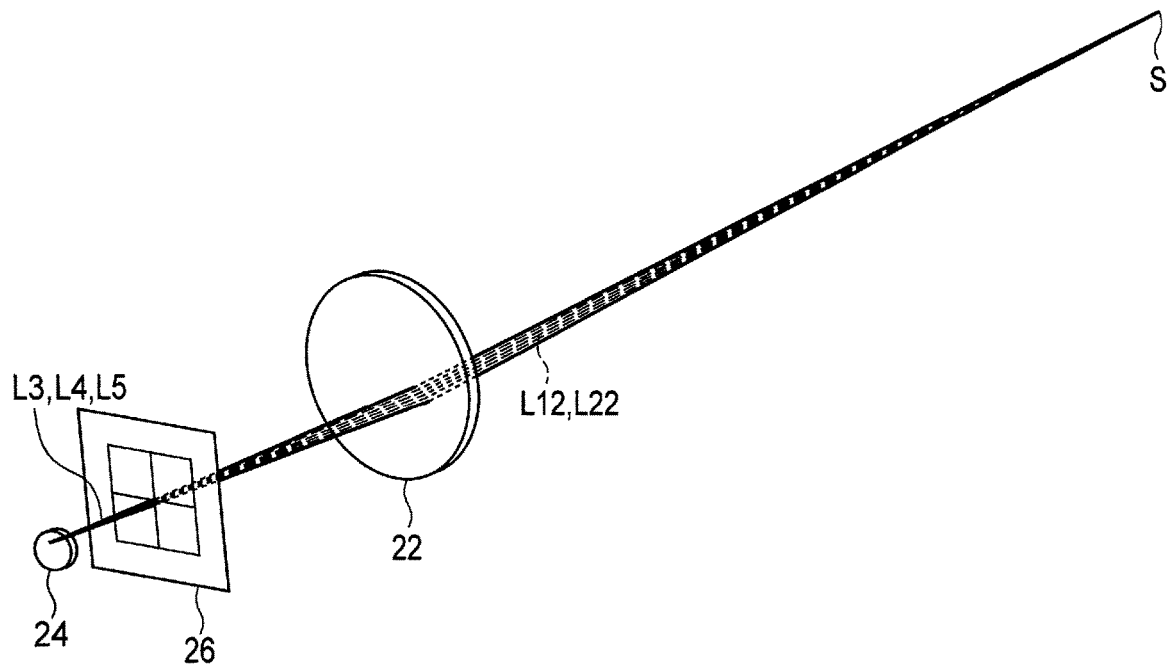
FIG. 5 is a schematic bird's eye view of an imaging optical system of the optical inspection apparatus illustrated in FIG. 4.
Figure 6:
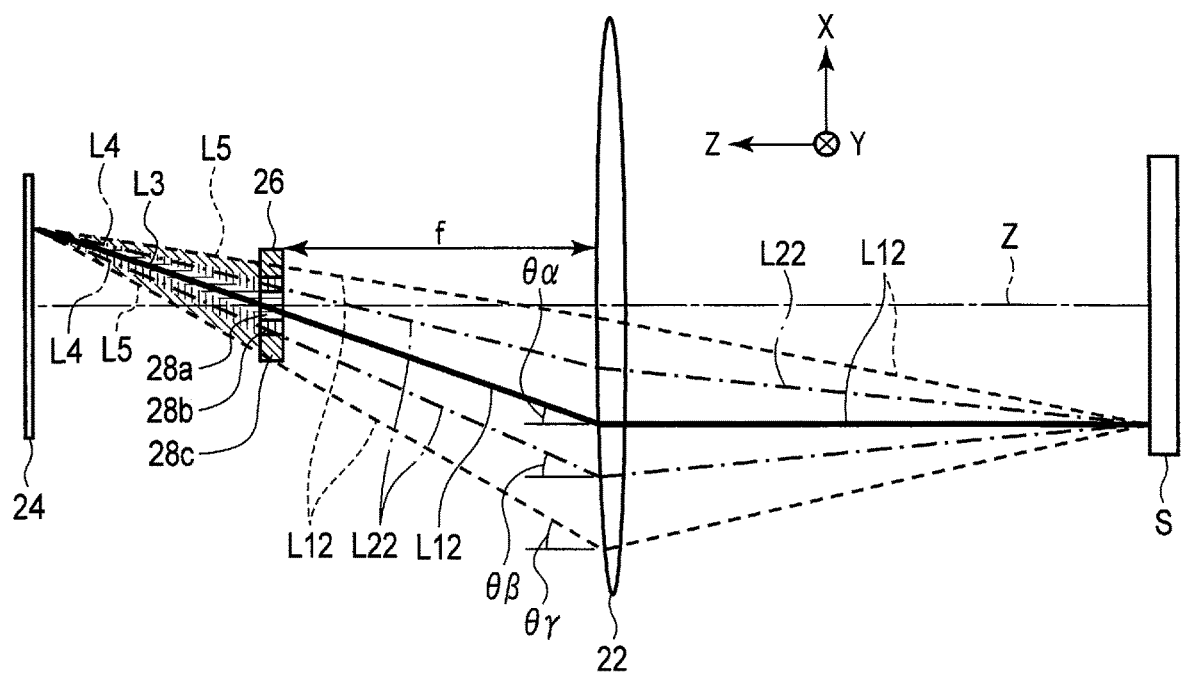
FIG. 6 is a schematic side view of the imaging optical system illustrated in FIG. 5.

FIG. 5 is a bird's eye view of an imaging optical system of the optical inspection apparatus 10 according to the present embodiment. FIG. 6 is a side view of the imaging optical system of the optical inspection apparatus 10 according to the present embodiment.

Light rays L12 and L22 scattered at an object point S form an image on the imaging surface of the imaging element 24 by the image-forming optical system 22. The aperture (wavelength selection region) 26a of the scattering light selector 26 is formed as a color aperture. The color aperture 26a of the scattering light selector 26 has such a characteristic as to pass a light beam of a specific wavelength (wavelength spectrum). The light beams L12 and L22 are separated into components by the color aperture 26a of the scattering light selector 26 disposed on the focal plane of the image-forming optical system 22.

Figure 7:
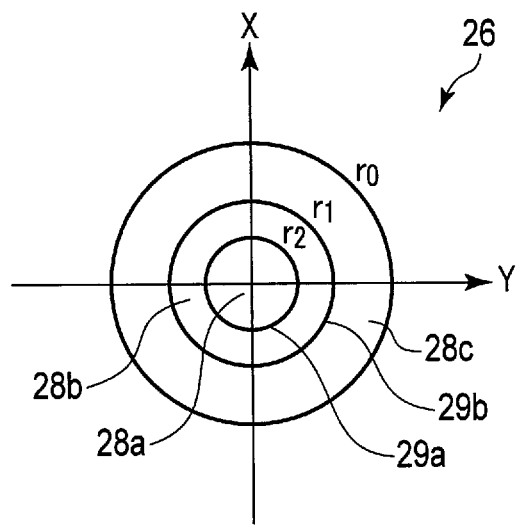
FIG. 7 is a schematic view illustrating a scattering light selector of the imaging optical system of the optical inspection apparatus illustrated in FIG. 4 to FIG. 6.

Here, as illustrated in an X-Y cross section in FIG. 7, the scattering light selector 26 is divided into a plurality of wavelength selection regions. It is assumed that the Z axis extends along the optical axis of the image-forming optical system 22. The wavelength selection regions may have any shapes. For example, wavelength selection regions have coaxial, concentric circular shapes (concentric shapes). In addition, the radii of the concentric circles, which define the regions, are set to be r0, r1, . . . , in the order from the outside. In the present embodiment, the aperture (color aperture) 26a of the scattering light selector 26 are divided into three regions. The aperture 26a of the scattering light selector 26 have radii r0, r1 and r2 from the outside. A region between the radius r1 and radius r0 is set as a third region 28c. A region between the radius r2 and radius r1 is set as a second region 28b. A region with the radius r2 or less is set as a first region 28a.

The first region 28a passes the first wavelength of the first light beam L12, and blocks the second wavelength of the second light beam L22 and the third wavelength of the first light beam L12. The second region 28b passes the second wavelength of the second light beam L22, and blocks the first wavelength and third wavelength of the first light beam L12. The third region 28c passes the third wavelength of the first light beam L12, and blocks the first wavelength of the first light beam L12 and the second wavelength of the second light beam L22.

Note that a boundary 29a between the first region 28a and the second region 28b is formed, for example, as a black shield ring. A boundary 29b between the second region 28b and the third region 28c is formed, for example, as a black shield ring.

By the above configuration of the aperture (color aperture) 26a of the scattering light selector 26, the light beams immediately before entering the imaging element 24 are separated into a third light beam L3 (an angle $\theta\alpha$ in FIG. 6), a fourth light beam L4 (an angle $\theta\beta$ in FIG. 6) and a fifth light beam L5 (an angle $\theta\gamma$ in FIG. 6) in the order from the smallest formed angle, in accordance with the formed angle to the optical axis (Z axis). Note that the angle $\theta\alpha$ in FIG.

6 is an angle of the light beam L12 to the optical axis, the light beam L12 being reflected at the scattering angle θ1 in FIG. 4 and refracted by the imaging-forming optical system 22. The angle θβ is an angle of the light beam L22 to the optical axis, the light beam L22 being reflected at the scattering angle θ2 in FIG. 4 and refracted by the imaging-forming optical system 22. The angle θγ is an angle of the light beam L12 to the optical axis, the light beam L12 being reflected at the scattering angle θ3 in FIG. 4 and refracted by the imaging-forming optical system 22.

Specifically, the scattering light selector 26 emits the third light beam L3, fourth light beam L4 and fifth light beam L5 which are passing light beams of at least three mutually different wavelength regions, at the same time as the first light beam L12 passes. Of these light beams, the wavelength spectrum of the fourth light beam L4 is different from the wavelength spectrum of the first light beam L12 reflected by the object S.

In the scattering light selector 26, since the aperture (wavelength selection region) 26a is in coaxial rotation symmetry, spectral separation is performed in accordance with the scattering angle on the surface (object point) of the object S. In addition, the scattering light selector 26 of the present embodiment has a concentric circular shape, which is one of rotation-symmetric shapes, as illustrated in FIG. 7. However, aside from this, if the scattering light selector 26 is rotation-symmetric, the scattering light selector 26 can perform spectral separation in accordance with the scattering angle.

An operation of the optical inspection apparatus 10 according to the present embodiment will be described.

The first illuminator 12 and second illuminator 14 simultaneously emit the light beams L10 and L20. The first light beam L10 is substantially a collimated beam, and is made incident, by the beam splitter 20, on the surface of the object (inspection object) S along the optical axis direction of the image-forming optical system 22. The second light beam L20 is substantially a collimated beam, and is directly incident on the surface of the object S.

The first wavelength of the first light beam L12 reflected from the object S passes through the first region 28a, which is the center of the scattering light selector 26, by the image-forming optical system 22, and emanates as the third light beam L3. Here, the scattering light selector 26 is disposed on the focal plane of the image-forming optical system 22. Thus, of the light beams reflected from the object (inspection object) S, the light beam L12, which is substantially parallel to the optical axis of the image-forming optical system 22, passes through the center of the scattering light selector 26, and emanates as the third light beam L3.

The third wavelength of the first light beam L12 reflected from the object S passes through the third region 28c of the scattering light selector 26 by the image-forming optical system 22, and emanates as the fifth light beam L5.

The second wavelength of the second light beam L22 reflected from the object S passes through the second region 28b of the scattering light selector 26 by the image-forming optical system 22, and emanates as the fourth light beam L4.

When the third light beam L3 is made incident on the imaging element 24, the incidence angle of the first light beam L10 on the object S is substantially parallel to the optical axis of the image-forming optical system 22, and the reflection angle thereof is also substantially parallel to the optical axis. Thus, the scattering angle θ1 is substantially zero, regardless of the incidence position on the object S. Thereby, the first scattering angle θ1 with respect to the surface of the object S is substantially constant for all pixels of the imaging element 24.

When the fourth light beam L4 is made incident on the imaging element 24, the second scattering angle θ2 is restricted by the scattering light selector 26, and is greater than the first scattering angle θ1.

When the fifth light beam L5 is made incident on the imaging element 24, the incidence angle of the first light beam L10 on the object S is substantially parallel to the optical axis of the image-forming optical system 22, and the reflection angle thereof (third scattering angle θ3) is restricted by the scattering light selector 26. Thus, the third scattering angle θ3 with respect to the surface of the object S is substantially constant, regardless of the incidence position on the object S. Thereby, the third scattering angle θ3 with respect to the surface of the object S is substantially constant for all pixels of the imaging element 24.

From the above, the optical inspection apparatus 10 of the present embodiment can make the first scattering angle θ1 and third scattering angle θ3 with respect to the surface of the object S substantially constant for all pixels of the imaging element 24. In addition, the scattering angles become greater in the order of the first scattering angle θ1, second scattering angle θ2 and third scattering angle θ3. Specifically, the optical inspection apparatus 10 can simultaneously acquire scattering light components of different scattering angles, and can acquire light intensity with respect to each scattering angle. Thereby, the optical inspection apparatus 10 can acquire a light intensity distribution with respect to the scattering angles over all pixels of the imaging element 24.

It is assumed that the imaging element 24 can acquire RGB color images. According to the optical inspection apparatus 10 of the present embodiment, the imaging element 24 can acquire scattering light with three kinds of scattering angles θ1, θ2 and θ3 over the entire surface at respective points of the imaging surface of the imaging element 24. Thereby, at each pixel of the acquired image of the imaging element 24, the imaging element 24 can acquire, as an intensity ratio of RGB, an intensity ratio between the third light beam (first scattering light) L3 of the first scattering angle θ1, the fourth light beam (second scattering light) L4 of the second scattering angle θ2, and the fifth light beam (third scattering light) L5 of the third scattering angle θ3. Thus, the optical inspection apparatus 10 according to the present embodiment can acquire scattering intensities with respect to the three scattering angles θ1, θ2 and θ3 to the surface of the object S. Specifically, the optical inspection apparatus 10 according the present embodiment, which acquire three scattering light beams, can acquire, by one shot, the BRDF with respect to the surface of the object S for the number of pixels of the imaging element 24. It is known that the surface property or material of the object S can be discriminated by the acquired BRDF. Thus, the optical inspection apparatus 10 according to the present embodiment can acquire, by one shot, the BRDF for the number of pixels of the imaging element 24. The optical inspection apparatus 10 can distinguish the surface property or material of the object S from the acquired BRDF.

In a photometric stereo method using a plurality of light sources 12 and 14, the scattering angle distribution of light intensities can be acquired over all pixels of the imaging element 24. Thereby, there is an advantageous effect that the precision in calculation of the three-dimensional shape of the surface of the object S can be improved by the optical inspection apparatus 10.

In the present embodiment, the example was described in which the first region 28a passes the first wavelength, the second region 28b passes the second wavelength, and the third region 28c passes the third wavelength. The first region 28a may pass the second wavelength, and may block the first wavelength and the third wavelength. The second region 28b may pass the third wavelength, and may block the first wavelength and the second wavelength. The third region 28c may pass the first wavelength, and may block the second wavelength and the third wavelength. In this manner, the regions 28a, 28b and 28c of the aperture 26a of the scattering light selector 26 illustrated in FIG. 7 can set the wavelengths to be transmitted, as appropriate.

In the present embodiment, the example was described in which the aperture 26a of the scattering light selector 26 includes the three regions 28a, 28b and 28c. The number of regions may be four or more, for example, such that regions of other different wavelengths may be provided. In addition, any one of the regions may be configured to be, for example, a black region, and the black region may not transmit, and may block, light of a predetermined wavelength.

In the optical inspection apparatus 10 according to the present embodiment, the beam splitter 20 is a non-polarizing beam splitter, but may be a polarizing beam splitter. In this case, regular reflective light of the object S can be cut by the principle of crossed Nicols, and the intensity of scattering light including no regular reflected component can be enhanced.

In the present embodiment, the region division of the scattering light selector 26 is performed based on wavelengths. On the other hand, such region division may be performed by utilizing polarization, or region division may be performed based on different polarizations. In this case, the first light beam and second light beam may be mutually orthogonal polarized light beams.

The scattering light selector 26 adopts the wavelength division based on wavelength, but may adopt both the wavelength division and the polarization division at the same time.

In the present embodiment, the region division of the scattering light selector 26 is performed into the first region 28a to the third region 28c. On the other hand, the region division is not limited to this, and the division may be performed in any manner, and division of a greater number of regions may be possible. Furthermore, the number of illumination light beams (first light beam L10 and second light beam L20) is not limited to two, and a greater number of illumination light beams may be used.

According to the present embodiment, there is provided the optical inspection apparatus 10 which can simultaneously acquire scattering light beams with various angles with respect to the surface of the object S.

As described above, the optical inspection apparatus 10 according to each of the first to fourth embodiments includes the first illuminator 12 configured to emit a first light beam; the image-forming optical system 22 on which the first light beam reflected by the object S is made incident; the scattering light selector 26 configured to emit passing light beams of at least two mutually different wavelength regions, at the same time as the first light beam passes, with a wavelength spectrum of at least one of the passing light beams of the at least two mutually different wavelength regions being different from a wavelength spectrum of the reflected first light beam; and the imaging element 24 on which the passing light beams of the at least two mutually different wavelength regions form an image.

According to the first to fourth embodiments, there is provided the optical inspection apparatus 10 which can simultaneously acquire scattering light beams with various angles with respect to the surface of the object S.

Preferably, the optical inspection apparatus 10 includes the second illuminator 14 which is located at a position different from the position of the first illuminator 12, and is configured to emit the second light beam simultaneously with the first light beam. The first light beam and the second light beam are reflected by the object S and made incident on the image-forming optical system 22. The scattering light selector 26 emits the first light beam, which has passed through the image-forming optical system 22, as the third light beam L3 which is one of passing light beams, and emits the second light beam, which has passed through the image-forming optical system 22, as the fourth light beam L4 which is the other of the passing light beams and has a wavelength region different from the wavelength region of the third light beam L3. The third light beam L3 and fourth light beam L4, which emanate from the scattering light selector 26, form an image on the imaging element 24.

Preferably, the scattering light selector 26 includes the first region 28a and the second region 28b, and the first region 28a and the second region 28b have different wavelength regions of light beams which are transmitted toward the imaging element 24.

Preferably, the image-forming optical system 22 and the scattering light selector 26 form a telecentric lens optical system.

Fifth Embodiment

The basic configuration of an optical inspection apparatus 10 according to the present embodiment is the same as that of the optical inspection apparatus 10 according to each of the first to fourth embodiments. Hereinafter, the first illuminator 12, which can be used as appropriate in the optical inspection apparatus 10 of each of the first to fourth embodiments, will be described. Here, although the first illuminator 12 is described, the second illuminator 14 may adopt the same configuration as the first illuminator 12 described below.

Figure 8:
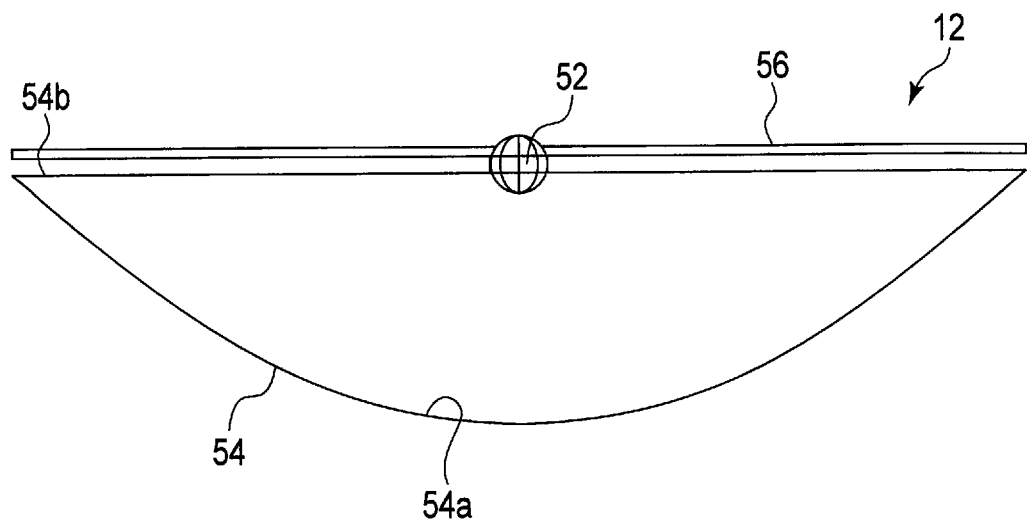
FIG. 8 is a schematic side view of an illuminator according to a fifth embodiment.

Preferably, the first light beams L10 emitted from the first illuminator 12 are parallel (collimated beam). As illustrated in FIG. 8, such a collimated beam can be realized by the first illuminator (illumination device) 12 in which a light source 52 and a reflector 54 are combined.

FIG. 8 is a side view of the first illuminator 12. The first illuminator 12 includes a light source 52 which emits a first light beam L10, a reflector 54, and a connector 56 which is thermally connected to the light source 52 and transfers heat of the light source 52.

The connector 56 includes a transmissive plate (transmissive medium) which transmits the first light beam L10. For example, an LED is used as the light sources 52. The light source 52 may be, as well as the LED, a halogen lamp, a xenon lamp, an X-ray light source, or an infrared light source, or any other kind of light source which emits electromagnetic waves which are waves composed of an electric field component and a magnetic field component. Also when the light source 52 is a laser and emits a collimated beam, the reflector 54 and transmissive plate 56 according to the present embodiment can be used.

The light source 52 and reflector 54 are disposed to face each other. The reflector 54 includes a reflection surface (bottom surface) 54a which extends along a parabolic plane or a quasi-parabolic plane, and an outer edge 54b. A light emission surface of the light source 52 faces the reflection surface 54a of the reflector 54. The light source 52 is disposed at a position including the focal point of the reflection surface 54a of the reflector 54, or in the vicinity of this position. The reflection surface 54a of the reflector 54 is formed in such a manner as to convert the light emitted from the light emission surface of the light source 52, which is disposed at the position including the focal point of the reflection surface 54a of the reflector 54, or in the vicinity of this position, into a collimated beam. The reflector 54 is formed of, for example, aluminum, an aluminum alloy, or the like. The reflection efficiency of the reflection surface 54a of the reflector 54 can be set as appropriate.

The reflector 54 and transmissive plate 56 are depicted as having a gap therebetween, but there may be no such gap. When there is the gap, the transmissive plate 56 is spaced apart from the reflector 54. The transmissive plate 56 is formed of, for example, transmissive ceramics. The transmissive plate 56 is opposed to the reflection surface 54a and outer edge 54b of the reflector 54. The transmissive plate 56 has a substantially discoidal shape. Specifically, the transmissive plate 56 serving as the connector extends radially from the light source 52. The diameter of the outer edge 54b of the reflector 54 may be substantially equal to the diameter of the transmissive plate 56, or the transmissive plate 56 may protrude from the outer edge 54b of the reflector 54. The light source 52 and transmissive plate 56 are thermally connected. The light source 52 is supported at the center of the substantially discoidal transmissive plate 56, or in the vicinity of the center. A material with good thermal conductivity is used for the transmissive plate 56. As is known, the thermal conductivity of transmissive ceramics is lower than the thermal conductivity of a metallic material such as aluminum or an aluminum alloy, but is several tens of times higher than the thermal conductivity of glass.

Next, an operation of the illuminator 12 of the present embodiment will be described.

Figure 9:
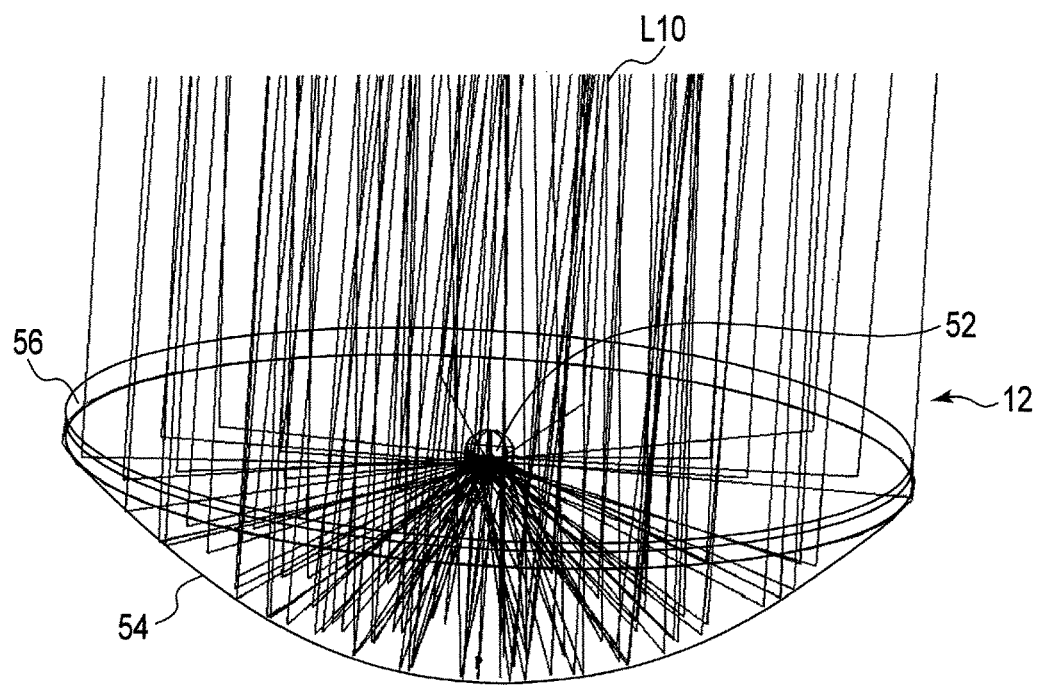
FIG. 9 is a schematic view illustrating light beams emitted from the illuminator illustrated in FIG. 8.

The light source 52 is disposed at the focal position of the reflection surface 54a of the reflector 54, or in the vicinity of the focal position, and the light emission surface of the light source 52 faces the reflection surface 54a of the reflector 54. Thus, as illustrated in FIG. 9, all light beams L10, which are emitted from the light source 52 toward the reflection surface 54a of the reflector 54, are reflected by the reflection surface 54a of the reflector 54 and converted to a collimated beam. Further, the light beams L10 of the collimated beam pass through the inside of the outer edge 54b of the reflector 54, and pass through the transmissive plate 56 in the state of the collimated beam.

Although the light source 52 generates heat, the light source 52 is thermally connected to the transmissive plate 56. Since the thermal conductivity of the transmissive ceramic, which is one kind of the transmissive plate 56, is several tens of times higher than the thermal conductivity of glass, the entirety of the transmissive plate 56 is immediately uniformly heated. Thereby, the heat transferred from the light source 52 to the transmissive plate 56 is radiated to the outside of the first illuminator 12 from the surface of the transmissive plate 56. Specifically, the transmissive plate 56 is thermally connected to the light source 52, and radiates the heat transferred from the light source 52 to the outside.

The transmissive plate 56 has a diameter which is substantially equal to, for example, the diameter of the outer edge 54b of the reflector 54. Thus, by using the transmissive plate 56, the heat generated by the light source 52 and transferred to the transmissive plate 56 can efficiently be radiated. Thereby, the problem of heat radiation, which is a technical challenge of the light source 52 that generates heat, can be solved.

In the present embodiment, all light beams L10 emitted from the light source 52 reach the reflector 54. Thus, there is an advantage that the light output ratio of the illuminator 12 is improved. On the other hand, in the conventional art, it is difficult to make all light beams, which are emitted from the light source, reach the reflector. The reason for this is that, in the conventional art, if the light source 52 is opposed to the reflector, a member that supports the light source 52 and a heat transfer member would block light and the light output ratio would lower. In other words, it was practically difficult to oppose the light source 52 and the reflector to each other, and therefore the light source 52 and the reflector could not be opposed to each other. Thus, it was difficult to make all light beams reach the reflector 54. In the present embodiment, there is an advantageous effect that the light source 52 can be supported by the transmissive plate 56, without blocking light.

Besides, in the present embodiment, since the light source 52 can be disposed at the focal position of the reflection surface 54a of the reflector 54, there is an advantage that the parallelism of the collimated beam can be enhanced and the divergence angle can be decreased.

According to the present embodiment, there can be provided the illuminator (illumination device) 12, 14 which can efficiently radiate the heat of the light source 52 which generates heat.

Sixth Embodiment

The basic configuration of an optical inspection apparatus 10 according to the present embodiment is the same as that of the optical inspection apparatus 10 according to each of the first to fourth embodiments. Hereinafter, the first illuminator 12, which can be used as appropriate in the optical inspection apparatus 10 of each of the first to fourth embodiments, will be described. Here, although the first illuminator 12 is described, the second illuminator 14 may adopt the same configuration as the first illuminator 12 described below. The present embodiment is a modification of the fifth embodiment.

Figure 10:
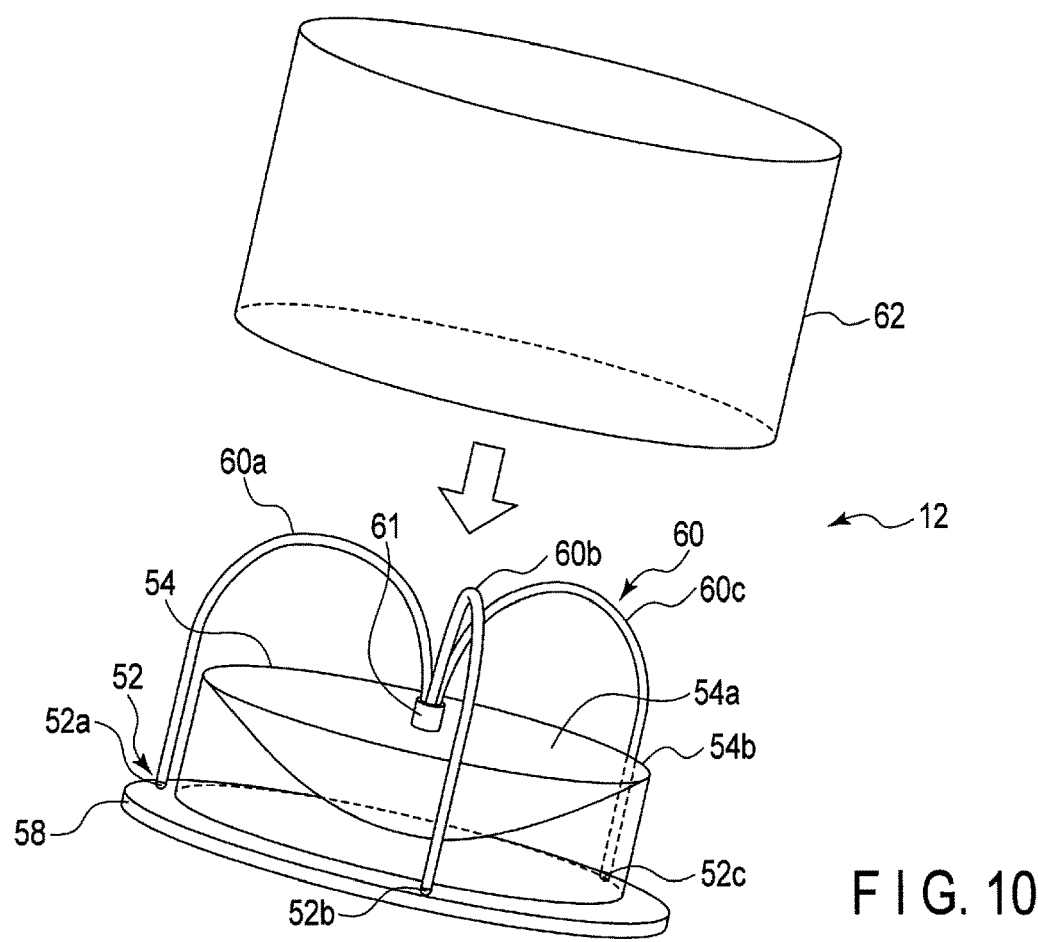
FIG. 10 is a schematic view of an illuminator according to a sixth embodiment.

Preferably, the first light beams L10 emitted from the first illuminator 12 are parallel (collimated beam). As illustrated in FIG. 10, such a collimated beam can be realized by the first illuminator (illumination device) 12 in which a light source 52 and a reflector 54 are combined.

FIG. 10 is a perspective view of the first illuminator 12. The first illuminator 12 includes a light source 52 which emits a first light beam L10, a reflector 54, and a connector (heat transfer body) 58 which is thermally connected to the light source 52 and transfers heat of the light source 52. Here, the number of light sources 52 may be one, or may be plural, as in the present embodiment. The light source 52 includes a light source 52a, a light source 52b and a light source 52c.

The first illuminator 12 further includes a light guide 60. The number of light guides 60 may be one, or may be plural, as in the present embodiment. Here, it is assumed that the light guide 60 is, for example, a J-shaped solid rod. As the light guide 60, an optical fiber bundle may be used. The light guide 60 includes a J-shaped light guide 60a, a J-shaped light guide 60b and a J-shaped light guide 60c. A light emission surface of each light source 52a, 52b, 52c is disposed to be opposed to one end face of each light guide member 60a, 60b, 60c. Further, the other end face of each light guide member 60a, 60b, 60c is disposed at the focal point of the reflection surface 54a of the reflector 54, or in the vicinity of the focal point.

A transparent diffuser 61 is disposed at the focal point of the reflection surface 54a of the reflector 54, or in the vicinity of the focal point. The transparent diffuser 61 diffuses, toward the reflection surface 54a, the light which is emitted from the light sources 52a, 52b and 52c and guided by the light guides 60a, 60b and 60c. It should be noted, however, that the transparent diffuser 61 may not be provided.

The illuminator 12 of the present embodiment includes a transparent cover 62 which covers the light source 52, the reflector 54, the connector 58, and the light guides 60. The transparent cover 62 can shield the light source 52, reflector 54, the connector (heat transfer body) 58 and light guide 60 against contamination of dust, etc. Note that the transparent cover 62 may not be provided.

Similarly as described in the fifth embodiment, an example in which an LED, for instance, is used as the light source 52 will be described. However, the light source 52 may be, as well as the LED, a halogen lamp, a xenon lamp, a laser light source, an X-ray light source, or an infrared light source, or any other kind of light source which emits electromagnetic waves which are waves composed of an electric field component and a magnetic field component.

The connector (heat transfer body) 58 is formed of a metal with good thermal conductivity, such as aluminum or an aluminum alloy. The light sources 52a, 52b and 52c are connected to, i.e. are in contact with, the connector (heat transfer body) 58.

Next, an operation of the illuminator 12 of the present embodiment will be described.

Although the light source 52 (52a, 52b, 52c) generates heat, the light source 52 is thermally connected to the connector 58. Since the connector 58 is formed of a material with high thermal conductivity such as an aluminum alloy, heat can efficiently be transferred to a radiation part (not shown) that is exposed to the outside, for example, that surface of the connector 56, which is opposite to the surface connected to the light source 52 (52a, 52b, 52c). Thereby, heat radiation occurs from the light source 52 (52a, 52b, 52c) to the outside of the connector 58, and heat of the light source 52 can efficiently be radiated. Hence, the problem of heat radiation, which is a technical challenge of the light source 52 that generates heat, can be solved.

Light emitted from the light source 52 (52a, 52b, 52c) enters one end face of the J-shaped light guide 60 (60a, 60b, 60c) and emanates from the other end face thereof. Since the other end face of the J-shaped light guide 60 is disposed at the focal point of the reflection surface 54a of the reflector 54, or in the vicinity of the focal point, all the light emanating from the end face of the J-shaped light guide 60 reaches the reflection surface 54a of the reflector 54 (through the transparent diffuser 61), and is then reflected by the reflection surface 54a and converted to the collimated beam.

Furthermore, since the transparent diffuser 61 is disposed at the focal point of the reflection surface 54a of the reflector 54, or in the vicinity of the focal point, there is an advantageous effect that the light emitted from the plural light sources 52 (52a, 52b, 52c) can be made uniform. Besides, by using the light sources 52a, 52b and 52c, there is an advantageous effect that the colors (wavelengths) of light beams emitted from the light sources 52a, 52b and 52c may be not only an identical color (identical wavelength region) but also a mixed color (different wavelength regions). Thus, when the three light sources 52a, 52b and 52c are used, the light emitted from the first illuminator 12 may be the light beams L10 of the identical wavelength region or may be the light beams L10 of different wavelength regions, such as the above-described first to third wavelengths.

In the present embodiment, since almost all the light beams can reach the reflection surface 54a of the reflector 54, there is an advantageous effect that the light output ratio is improved. On the other hand, in the conventional art, it was difficult to make all light beams, which are emitted from the LED, reach the reflector. In addition, in the present embodiment, since the light can be guided to the focal position of the reflection surface 54a of the reflector 54, there is an advantageous effect that the parallelism of the collimated beam can be enhanced and the divergence angle can be decreased.

According to the present embodiment, there can be provided the illuminator (illumination device) 12, 14 which can efficiently radiate the heat of the light source 52 which generates heat.

(Modification)

FIG. 11 shows a perspective view and a light beam diagram of a modification of the present embodiment. The first illuminator 12 includes a light source 52 which emits first light beams L10, a reflector 54, and a connector 58 which is thermally connected to the light source 52 and transfers heat of the light source 52. Here, the number of light sources 52 may be one, or may be plural, as in the present embodiment. The first illuminator 12 further includes a light guide 63, and the reflector 54 and the light guide 63 are formed as one body. Preferably, a light emission surface of the light source 52 is integrated, for example, buried, in the light guide body 63.

The light guide 63 includes a first region 63a and a second region 63b. The first region 63a and second region 63b are formed as one body.

The first region 63a includes a curved surface (first curved surface) 64a, which is formed of one or a plurality of parabolic surfaces or quasi-parabolic surfaces; two pairs of opposed surfaces 64b, 64c, 64d and 64e; and a planar surface 64f opposed to the curved surface 64a. In the present embodiment, the paired opposed surfaces 64b and 64c are perpendicular to the other pair of opposed surfaces 64d and 64e. The planar surface 64f is perpendicular to the two pairs of opposed surfaces 64b, 64c, 64d and 64e.

The second region 63b includes a planar surface 65a which is common to the planar surface 64f of the first region 63a; curved surfaces (second curved surfaces) 65b and 65c which are formed of a plurality of parabolic surfaces or quasi-parabolic surfaces; a pair of opposed surfaces 65d and 65e; and a planar surface 65f opposed to the planar surface 65a. The opposed surface 64b and opposed surface 65d are formed as a continuous planar surface. The opposed surface 64c and opposed surface 65e are formed as a continuous planar surface.

A reflection surface 54a of the reflector 54 is formed, for example, by evaporation-depositing aluminum on the curved surface (first curved surface) 64a of the light guide 63. Thus, the reflection surface 54a of the reflector 54 is also a parabolic surface or a quasi-parabolic surface. The light source 52 is disposed at the focal point of the reflection surface 54a of the reflector 54, or in the vicinity of the focal point. The light emission surface of the light source 52 is opposed to the reflection surface 54a of the reflector 54.

By the above configuration, light beams, which emitted from the light source 52 and made incident on the light guide 63, are guided by the light guide 63, reach the reflection surface 54a of the reflector 54 (the first curved surface 64a of the light guide 63), are reflected by the reflection surface 54a of the reflector 54, and travel as a collimated beam with respect to one direction. Here, since the divergence of the light emitted from the light source 52 is suppressed by the guiding by the first region 63a of the light guide body 63, there is an advantageous effect that the illuminator (illumination device) 12 can be made impact. The second curved surfaces 65b and 65c of the second region 63b of the light guide 63 are formed of parabolic surfaces or quasi-parabolic surfaces. Thereby, the light beams, which have become the collimated beam with respect to one direction, also become a collimated beam with respect to another orthogonal direction by internal total reflection in the second region 63b including other parabolic surfaces or quasi-parabolic surfaces of the light guide 63. Specifically, by using the illuminator (illumination device) 12 of the present modification, the light beams emitted from the light source 52 are converted to a collimated beam in the first region 63a of the light guide 63, and part or all of the remaining components, which are not the collimated beam, are converted to a collimated beam in the second region 63b of the light guide 63. In other words, there is an advantageous effect that the light beams become collimated beams in two orthogonal directions.

Seventh Embodiment

The basic configuration of an optical inspection apparatus 10 according to the present embodiment is the same as that of the optical inspection apparatus 10 according to each of the first to fourth embodiments. Hereinafter, the first illuminator 12, which can be used as appropriate in the optical inspection apparatus 10 of each of the first to fourth embodiments, will be described. Here, although the first illuminator 12 is described, the second illuminator 14 may adopt the same configuration as the first illuminator 12 described below. The present embodiment is a modification of the fifth embodiment and sixth embodiment.

Preferably, the first light beams L10 emitted from the first illuminator 12 are parallel (collimated beam). As illustrated in FIG. 12, such a collimated beam can be realized by the first illuminator (illumination device) 12 in which a light source 52 and a reflector 54 are combined.

FIG. 12 is a side view of the first illuminator 12. The first illuminator 12 includes a light source 52 which emits a first light beam L10, a reflector 54, and a connector 58 which is thermally connected to the light source 52 and transfers heat of the light source 52.

Similarly as described in the fifth embodiment, an example in which an LED, for instance, is used as the light source 52 will be described. However, the light source 52 may be, as well as the LED, a halogen lamp, a xenon lamp, a laser light source, an X-ray light source, or an infrared light source, or any other kind of light source which emits electromagnetic waves which are waves composed of an electric field component and a magnetic field component.

The light source 52 and the reflector 54 are disposed to face each other. The reflector 54 is formed in the same manner as described in the fifth embodiment. The light source 52 is disposed at a position including the focal point of the reflector 54, or in the vicinity of this position. A light emission surface of the light source 52 is opposed to a reflection surface 54a of the reflector 54.

The connector 58 includes a supporter which supports the light source 52. The supporter 58 has such a shape as to extend from the light source 52 toward a central part of the reflection surface 54a of the reflector 54 or toward the vicinity of the central part. The material of the supporter 58 is, for example, a metal with good thermal conductivity, such as aluminum or an aluminum alloy. The supporter 58 is thermally connected to the central part of the reflection surface 54a of the reflector 54.

The reflector 54 is configured to radiate heat to the outside by the entirety of the outer peripheral surface of the reflector 54, which is opposite to the reflection surface 54a of the reflector 54.

Next, an operation of the illuminator 12 of the present embodiment will be described.

Figure 13:
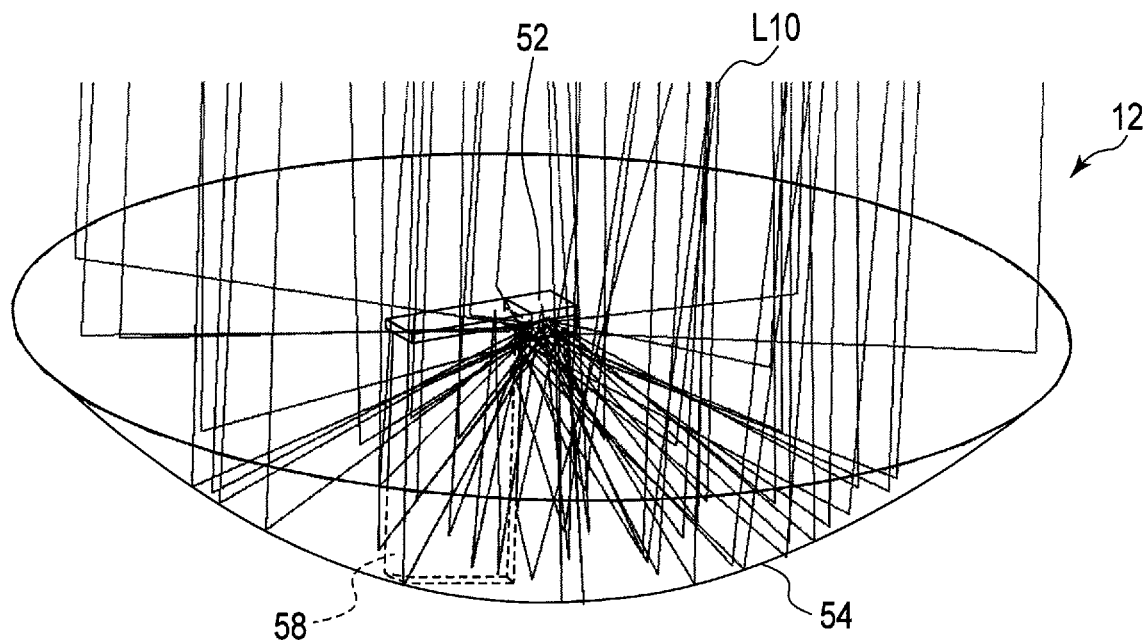
FIG. 13 is a schematic view illustrating light beams emitted from the illuminator illustrated in FIG. 12.

The light source 52 is disposed at the focal position of the reflection surface 54a of the reflector 54, or in the vicinity of the focal position, and the light emission surface of the light source 52 faces the reflection surface 54a of the reflector 54. Thus, as illustrated in FIG. 13, all light beams L10, which are emitted from the light source 52 toward the reflection surface 54a of the reflector 54, are reflected by the reflection surface 54a of the reflector 54 and converted to a collimated beam. Further, the light beams L10 of the collimated beam pass through the inside of the outer edge 54b of the reflector 54 in the state of the collimated beam.

Although the light source 52 generates heat, the light source 52 is thermally connected to the supporter 58. Since the supporter 58 is formed of a material with high thermal conductivity such as an aluminum alloy, heat can efficiently be transferred to the reflector 54. The reflector 54, too, is formed of a material with high thermal conductivity such as an aluminum alloy. Thereby, heat radiation occurs from the reflector 54 to the outside, and heat of the light source 52 can efficiently be radiated. Hence, the problem of heat radiation, which is a technical challenge of the light source 52 that generates heat, can be solved.

A heat radiator (e.g. the transmissive plate 56 described in the fifth embodiment) may be provided as a separate member from the reflector 54. In this case, the supporter 58 is thermally connected to the heat radiator.

In the present embodiment, all light beams can reach the reflection surface 54a of the reflector 54. Thus, there is an advantage that the light output ratio is improved. On the other hand, in the conventional art, it was difficult to make all light beams, which are emitted from the light source, reach the reflector.

Besides, in the present embodiment, since the light source 52 can be disposed at the focal position of the reflector 54, there is an advantage that the parallelism of the collimated beam can be enhanced and the divergence angle can be decreased.

According to the present embodiment, there can be provided the illuminator (illumination device) 12, 14 which can efficiently radiate the heat of the light source 52 which generates heat.

First Modification

A first modification of the supporter 58, which functions as the connector of the illuminator 12 according to the present embodiment, will be described.

Figure 14:
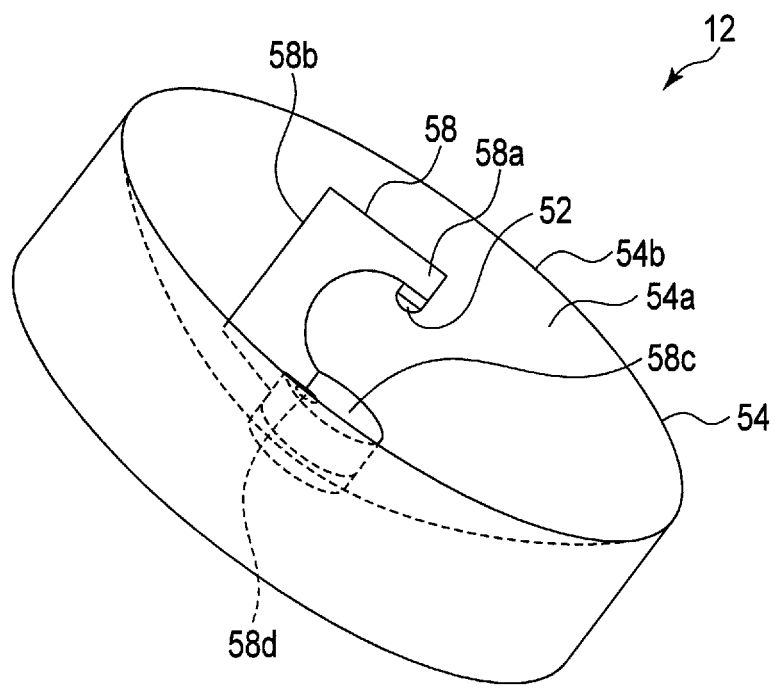
FIG. 14 is a schematic view of an illuminator according to a first modification of the seventh embodiment.

As illustrated in FIG. 14, the supporter 58 functioning as the heat transfer body includes a support portion 58a which supports the light source 52, and a columnar portion 58b which extends from the support portion 58a toward a bottom surface (reflection surface) 54a of the reflector 54, with an intermediate portion of the columnar portion 58b being away from the light source 52. The supporter 58 further includes a fixed portion 58c which is opposed to the light source 52 and is fixed to the central part of the reflection surface 54a of the reflector 54 or to the vicinity of the central part. The support portion 58a and the columnar portion 58b are formed as one body. The columnar portion 58b is formed in an arc shape or a U-shape and extends from the intermediate portion to the fixed portion 58c. The columnar portion 58b and the fixed portion 58c are formed as one body. The support portion 58a, columnar portion 58b and fixed portion 58c of the supporter 58 are formed of a metallic material such as aluminum or an aluminum alloy. The fixed portion 58c includes an opening 58d through which a wiring line (not shown) is passed.

There is an advantageous effect that the light output ratio is improved by the supporter 58 which includes the columnar portion 58b having such a substantially C shape as not to block the light beams from the light source 52 as much as possible. Specifically, in the supporter 58, the support portion 58a and the columnar portion 58b cooperate to have such a shape as to extend from the light source 52 toward the reflector 54, with an intermediate portion of the columnar portion 58b being away from the light source 52. Thereby, the illuminator 12 can reduce blocking of light beams emitted from the light source 52.

Second Modification

A second modification of the supporter 58, which functions as the connector of the illuminator 12 according to the present embodiment, will be described.

Figure 15:
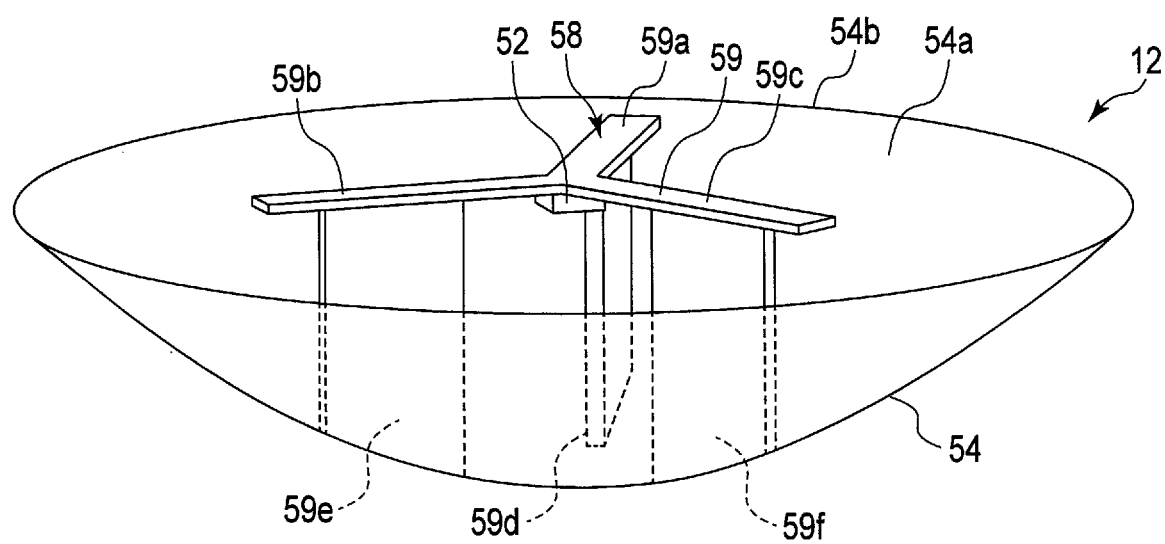
FIG. 15 is a schematic view of an illuminator according to a second modification of the seventh embodiment.

As illustrated in FIG. 15, the supporter 58 functioning as the connector includes a support member 59 which includes arms 59a, 59b and 59c extending from a center (hub) toward the outer edge 54b of the reflector 54, and supports the light source 52, i.e. is connected to the light source 52; and extension portions (columnar portions) 59d, 59e and 59f extending from the arms 59a, 59b and 59c toward the reflection surface 54a of the reflector 54. The extension portions (columnar portions) 59d, 59e and 59f may be fixed to a central part of the reflection surface 54a of the reflector 54, or may be fixed to a position deviating from the central part. The arms 59a, 59b and 59c of the support member 59 are spaced apart at intervals of, e.g. 120° with respect to the hub of the support member 59.

The extension portions (columnar portions) 59d, 59e and 59f of the support member 59 are formed of, for example, aluminum, an aluminum alloy, or the like.

Since the arms 59a, 59b and 59c of the support member 59 of the supporter 58 extend in three directions from the center of the support member 59, the heat radiation efficiency can be made higher than in the example of the supporter 58 illustrated in FIG. 12 and FIG. 13.

According to the second modification, there can be provided the illuminator (illumination device) 12, 14 which can efficiently radiate the heat of the light source 52 that generates heat.

As regards the illuminator 12, 14, it is required to efficiently radiate the heat of a proper light source 52. The heat radiation technology of the light source 52 described in the fifth to seventh embodiments can be used not only when the collimated beam is formed, but also when the light beams emitted from the light source are converged on the outside of the illuminator 12, 14, and when the light beams are diffused to the outside of the illuminator 12, 14.

[Supplementary Notes]

As regards the illuminator (illumination device) 12, 14 according to the fifth to seventh embodiments, the following can be said.

(Item 1)
An illumination device including:
a light source including a light emission surface configured to emit a light beam;
a reflector opposed to the light emission surface of the light source and configured to reflect the light beam emitted from the light emission surface; and
a connector thermally connected to the light source and configured to transfer heat of the light source,
wherein
the reflector includes a reflection surface extending along a parabolic plane or a quasi-parabolic plane, and
the light source is disposed at a position including a focal point of the reflection surface of the reflector.

(Item 2)
The illumination device of Item 1, wherein the connector is a transmissive medium which is thermally connected to the light source and radiates heat transferred from the light source.

(Item 3)
The illumination device of Item 1, wherein the transmissive medium is opposed to the reflection surface of the reflector.

(Item 4)
The illumination device of Item 1, wherein the transmissive medium is spaced apart from the reflector.

(Item 5)
The illumination device of Item 1, wherein the connector extends radially from the light source.

(Item 6)
The illumination device of Item 1, wherein the connector is a supporter which is thermally supports the light source and thermally connects the light source and the reflector.

(Item 7)
The illumination device of Item 6, wherein the supporter includes:
a support portion configured to support the light source, and
a columnar portion extending from the support portion toward a bottom surface (reflection surface) of the reflector, and
the columnar portion is thermally connected to an external environment.

(Item 8)
The illumination device of Item 6, wherein
the supporter includes:
a support portion configured to support the light source, and
a columnar portion extending from the support portion toward a bottom surface (reflection surface) of the reflector, with an intermediate portion of the columnar portion being away from the light source, and
the columnar portion is thermally connected to an external environment.

(Item 9)
An illumination device including:
a light source including a light emission surface configured to emit a light beam;
a reflector configured to reflect the light beam emitted from the light emission surface;
a connector thermally connected to the light source and configured to transfer heat of the light source; and
a light guide,
wherein
the reflector includes a reflection surface extending along a parabolic plane or a quasi-parabolic plane, and the light guide is configured to guide light emitted from the light source to a focal point of the reflector or to a vicinity of the focal point, and emits the light.

(Item 10)

The illumination device of Item 9, wherein the light guide and the reflector are formed as one body, and guide the light emitted from the light source to the reflection surface of the reflector, the reflection surface extending along the parabolic plane or the quasi-parabolic plane.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection apparatus comprising:
    a first illuminator configured to emit a first light beam;
    a second illuminator located at a position different from a position of the first illuminator, the second illuminator being configured to emit a second light beam simultaneously with the first light beam;
    an image-forming optical system on which the first light beam reflected by an object is incident;
    a scattering light selector configured to emit passing light beams of at least two mutually different wavelength regions, at the same time as the first light beam passes, a wavelength spectrum of at least one of the passing light beams being different from a wavelength spectrum of the reflected first light beam; and
    an imaging element on which the passing light beams simultaneously form an image;
    wherein:
        the first light beam and the second light beam are reflected by the object and made incident on the image-forming optical system,
        the scattering light selector is configured to emit the first light beam, which has passed through the image-forming optical system, as a third light beam which is one of the passing light beams, and configured to emit the second light beam, which has passed through the image-forming optical system, as a fourth light beam which is the other of the passing light beams, the fourth light beam having a wavelength region different from a wavelength region of the third light beam, and
        the third light beam and the fourth light beam, which emanate from the scattering light selector, form an image on the imaging element.

2. The optical inspection apparatus according to claim 1, wherein a first reflection angle of the first light beam on the object is less than a second reflection angle of the second light beam on the object.

3. The optical inspection apparatus according to claim 1, wherein a wavelength region of the first light beam, which the first illuminator emits, is different from a wavelength region of the second light beam which the second illuminator emits.

4. The optical inspection apparatus according to claim 3, comprising transmission filters which are configured to transmit light beams of different wavelength regions provided on an optical path of the first light beam which the first illuminator emits, and on an optical path of the second light beam which the second illuminator emits.

5. The optical inspection apparatus according to claim 1, wherein the first light beam, which the first illuminator emits, and the second light beam, which the second illuminator emits, are collimated beams.

6. The optical inspection apparatus according to claim 1, wherein one of the first light beam and the second light beam is coaxial reflected illumination.

7. The optical inspection apparatus according to claim 1, wherein
    the scattering light selector includes a first region and a second region, and
    the first region and the second region have different wavelength regions of light beams which are transmitted toward the imaging element.

8. The optical inspection apparatus according to claim 7, wherein the first region and the second region of the scattering light selector are in rotation symmetry.

9. The optical inspection apparatus according to claim 1, wherein the image-forming optical system and the scattering light selector form a telecentric optical system for at least one of the light beams.

* * * * *